(12) United States Patent
Dornbush et al.

(10) Patent No.: US 6,471,521 B1
(45) Date of Patent: Oct. 29, 2002

(54) SYSTEM FOR IMPLEMENTING COLLABORATIVE TRAINING AND ONLINE LEARNING OVER A COMPUTER NETWORK AND RELATED TECHNIQUES

(75) Inventors: Charles F. Dornbush, Weston, MA (US); Gary B. Robinson, Bangor, ME (US); Edward J. Cornelia, Belmont, MA (US)

(73) Assignee: Athenium, L.L.C., Weston, MA (US)

( * ) Notice: Subject to any disclaimer, the term of this patent is extended or adjusted under 35 U.S.C. 154(b) by 0 days.

(21) Appl. No.: 09/361,065

(22) Filed: Jul. 26, 1999

Related U.S. Application Data

(60) Provisional application No. 60/094,974, filed on Jul. 31, 1998.

(51) Int. Cl.[7] ................................................. G09B 3/00
(52) U.S. Cl. ...................................... 434/322; 434/353
(58) Field of Search ................................. 434/322, 323, 434/336, 349, 350, 362, 353; 345/331, 730, 731, 751

(56) References Cited

U.S. PATENT DOCUMENTS

| | | | | |
|---|---|---|---|---|
| 5,273,437 A | * | 12/1993 | Caldwell et al. | ............ 434/322 |
| 5,820,386 A | * | 10/1998 | Sheppard et al. | ........... 434/322 |
| 5,987,302 A | * | 11/1999 | Driscoll et al. | ............. 434/322 |
| 6,014,135 A | * | 1/2000 | Fernandes | .................... 345/331 |

* cited by examiner

Primary Examiner—Sam Rimell
(74) Attorney, Agent, or Firm—Daly, Crowley & Mofford, LLP

(57) ABSTRACT

A method and apparatus for implementing a collaborative training and learning system on a computer system accessible to a plurality of remote users through a computer network includes (a) means for displaying at a user site at least one template which includes a question field, an answer field, a discussion field, a rationale field and a references field, (b) means for inputting user-data including a user-defined question to be included in a predetermined area of the template, (c) means for storing the user-data in a predetermined field of a database, (d) means for retrieving the user-data from the database and for displaying the template and the user-data on a display of the computer system, and (e) means for collaborating with other users of the system.

12 Claims, 22 Drawing Sheets

Take Quiz Screen

☐ Quiz Question 3 of 5 - Microsoft Internet Explorer provided by MSN

File  Edit  View  Favorites  Tools  Help

TEAMThink

Take Quiz

Thursday
July 22 generate printable quiz

| Question | Question [3 ▼] of 5 *not answered<br>Upon notification that DUI / DWI has occured, the first step is to: |
|---|---|
| | ○ a) Contact the employee to confirm. |
| | ○ b) Find out if this is a first offense since signing the P&G car agreement. |
| Select Best Response | ○ c) Obtain a copy of the signed Company Car agreement and FAX to the employee. |
| | ○ d) Call the ES COE for counseling. |
| | ○ e) All of the above. |
| | ○ z) Question irrelevant / no answer correct |

[SAVE AND CONTINUE]  [VIEW ALL]

Question ID: 60

- Home
- Library
- email instructions
- team discussion
- help
- feedback
- preferences 63d'

FIG. 4A

Quiz Results Screen - summary http://teamthink.athenium.com/cgi-pg/passthru.py/cgi-pg/lp_teamresults.py?StudentID=PNG1&Course1- Microsoft Internet...

File  Edit  View  Favorites  Tools  Help

TEAMThink

View Results

- Home
- Library
- email instructions
- team discussion
- help
- feedback
- preferences

*Thursday July 22*

Round 2 ▶

Team Results

| Team | Score | Average | Rank (out of 2 teams) | Detail Links |
|---|---|---|---|---|
| Team A1 (member of this team) | Raw Score % | 65% | 2 | view questions authored |
| | Refined Score % | 75% | 1 | |
| | Average Question Power | 10.7 | 2 | |
| Team B1 | Raw Score % | 71% | 1 | view questions authored |
| | Refined Score % | 67% | 2 | |
| | Average Question Power | 12.5 | 1 | |

Quiz Results Screen - detail http://teamthink.athenium.com/cgi-pg/passthru.py/cgi.pg/pl_quizoutlook.py?StudentID=TK4416&scdi - Micros...

File  Edit  View  Favorites  Tools  Help

Home | library | email instructions | team discussion | help | feedback | preferences

The quiz that you took

Study Hints:
- The Table below summarizes that quiz you took. Examine the Power Questions carefully.
- Make sure you know the Power Questions. If you disagree with a question, add your comments to that question and/or e-mail your comments directly to the question author.
- Your Refined Score % measures your performance at answering Power Questions correctly.
- Your Raw Score % measures your overall agreement with the question authors.

| Refined Score % | 33 |
|---|---|
| Raw Score % | 57 |

Quiz Results

☐ correct   ☐ disagreed with author

Click on question number to view detail

| Question | You Chose | Authors Choice | Question Power | Power Question? | Author ID |
|---|---|---|---|---|---|
| 1 | b | b | 0.0 | | U2171 |
| 2 | b | b | 0.0 | | I5188 |
| 3 | c | e | 0.0 | | TL7357 |
| 4 | Disagreed with Choices | e | 50.0 | | U2172 |
| 5 | e | e | 12.5 | ✓ | TL7357 |
| 6 | e | e | 12.5 | ✓ | TH9407 |
| 7 | e | e | 0.0 | ✓ | I5188 |

Quiz Results Screen - item detail

View Quiz Results

Question 5 of 7    Question power: 12.5    Created by user TL7357  02:29PM, 23 Jun-99 (EDT)    *Thursday July 22*

Question: In case study number 2, what is the proper AMEX procedure to be followed in this situation?

| | You Chose | Author Chose | Answer | High Scorers Chose | Low Scorers Chose |
|---|---|---|---|---|---|
| Quiz Answers | a) ○ | a) ○ | Have the spouse make totally different seperate travel arrangements through a seperate travel agent. stay in a different room/location. and keep all expenses seperately. | 0 | 0 |
| | b) ○ | b) ○ | Book both trips through AMEX travel. but use a personal credit card to pay for the spouse's trip. the spouse's expenses for the hotel and meals would need to be paid for separately, and not submitted on the employee's expense report. | 0 | 0 |
| | c) ○ | c) ○ | Use the AMEX card as they did, but only expense/reimburse AMEX for the actual business expenses incurred; when the AMEX card bill arrives, pay the spouse's/personal share of the trip from their own personal funds to clear the balance. | 0 | 1 |
| | d) ○ | d) ○ | Should have used a personal credit card for the entire trip, and received cash reimbursement for the legitimate business expenses. | 0 | 0 |
| | e) ● | e) ● | Answer B or C | 2 | 1 |

Rationale: AMEX Card is not to be used for personal reasons. While C is convenient, it is not appropriate: the employee must use the AMEX card for the business related travel.

Reference Titles:

[SUBMIT]

Comments for Quiz Questions 6.    Question 10 - 45
TL7857  wrote:    Jump to most recent comments
Again, I hope this is right - I have searched through the policy, and it seems somewhat vague.    05:11PM 23 Jun-99 (EDT)

*FIG. 4D*

Course Setup Screen

TEAMThink Instructor: _____ Course: _____ Section: _____

[Home] [login] [Monitor] [Intervene] [Communicate] [Setup] [Preferences] [Help]

Create or Modify Course, Section and Round

Course Name: [Psychology]

Course ID: [PSY101]

Section Name: [Dr. Adams]

Section ID: [83]

Round Name: [Introduction]

Round ID: [1]

Continue (Home) (login) (Monitor) (Intervene) (Communicate) (Setup) (Preferences) (Help)
© 1999 Athenium LLC 64a'

*FIG. 4E*

User Enrollment Screen

Enrollment - Microsoft Internet Explorer provided by MSN

File  Edit  View  Favorites  Tools  Help

TEAMThink Instructor: _____ Course: _____ Section: _____

[Home] [login] [Monitor] [Intervene] [Communicate] [Setup] [Preferences] [Help]

Enrollment for Round [1 ▼]

○ Batch ......................

Upload File: [ Browse ]

● Individual ..................

User ID: [0441]  Password: [Jon]

First Name: [John]  E-mail: [Smith@xxy.c]

Last Name: [Smith]  Assign to team: [Red ▼]

[ Add ]

○ Self Registration ...........

Access ID: [        ]

Access Password: [        ]

Continue

Students currently enrolled

| Last | First | e-mail | password | team |
|------|-------|--------|----------|------|
| Solo | Hans  | falcon@starWars.com | fly | red |
|      |       |        |          |      |
|      |       |        |          |      |
|      |       |        |          |      |
|      |       |        |          |      |

(Home) (login) (Monitor) (Intervene) (Communicate) (Setup) (Preferences) (Help)

© 1999 Athenium LLC

Typical Database Record Layout
(130)

| Field Name | Field Type | Field Description |
|---|---|---|
| 130a — strCreatorUserID | String | The Creators User ID |
| 130b — courseID | Integer | The Course this Item belongs to |
| 130c — sectionID | Integer | The Section this Item belongs to |
| 130d — roundID | Integer | The Round this Item belongs to |
| 130e — strGroupID | String | The group this Item belongs to |
| 130f — quizSetID | Integer | The Quizset this Item belongs to |
| 130g — strQuestion | String | The question text |
| 130h — strReferences | String | The references text |
| 130i — strRationale | String | The rationale text |
| 130j — strCorrectAnswerID | String | The correct answer ID |
| 130k — powerScore | Float | The power score for this Item |

*FIG. 7*

SYSTEM FOR IMPLEMENTING COLLABORATIVE TRAINING AND ONLINE LEARNING OVER A COMPUTER NETWORK AND RELATED TECHNIQUES

CROSS REFERENCE TO RELATED APPLICATION

This application claims priority under 35 U.S.C. §119(e) from application Ser. No. 60/094,974 filed Jul. 31, 1998 which application is hereby incorporated herein by reference in its entirety.

STATEMENT REGARDING FEDERALLY SPONSORED RESEARCH

Not Applicable.

FIELD OF THE INVENTION

The present invention relates to a system for implementing collaborative training and online learning over a computer network and related techniques. More particularly, the method and apparatus provide users with a convenient, anonymous way to display, collaborate on and provide quiz information to other computer network users.

BACKGROUND OF THE INVENTION

Many people are familiar with the training methods and systems such as classroom training, computer-based training and web-based training. Such training techniques can be effective in certain instances, however, each technique tends to have certain drawbacks. Thus none of the known techniques offer a broad based single training method appropriate for a wide variety of different applications.

As a result of the popularity of training systems and the desire for individuals to improve their skill and the desire of corporations to improve the skills of its work force, and the advent of the Internet's World Wide Web (the Web), systems for providing training and online learning via the Web have appeared. These systems may be made available to the public through software application programs referred to as "Web browsers" which are used to locate resources on the World Wide Web.

To date, however, these systems for providing online learning via computer networks consist largely of pre-programmed course logic which is simply made available to a user or student for use in a self-paced learning process. That is, the knowledge source of the Web-based training systems is defined prior to the start of the training sessions (i.e. the knowledge source is pre-programmed). Furthermore, the efficiency and effectiveness of Web-based training systems, while relatively good, could stand improvement.

Accordingly, it would be desirable to provide a system for implementing a convenient, anonymous, secure, collaborative training and online learning system over a computer network. It would be desirable to provide a method and apparatus which will allow students or other users to learn from each other by creating and debating questions (items), and by being assessed by user-generated questions in a secure, anonymous, online environment. It would also be desirable to provide a secure and anonymous method for allowing such user interactivity in a network environment which can make use of multimedia resources and can make information available in a private way, i.e., providing access only to those people authorized to receive the information.

SUMMARY OF THE INVENTION

In accordance with the present invention, a system for implementing a collaborative training and learning system on a computer system accessible to a plurality of online users through a computer network includes: (a) means for displaying at a user site at least one template or web page which includes a question field, an answer field, a discussion field, a rationale field and a references field, (b) means for inputting user-data including a user-defined item to be included in a predetermined area of the template, (c) means for storing the user-data in a predetermined field of a database, (d) means for retrieving the user-data from the database and for displaying the template and the user-data on a display of the computer system, and (e) means for collaborating with other users of the system. With this particular arrangement, a learning system is provided which may be used to provide team-based learning over a computer network. Each user may connect to the learning system through a larger network, such as the Internet. The learning system includes at least one server computer which can be accessed by the online users. In a preferred embodiment, the online users remain anonymous (i.e., their true identity is shielded from other users).

The system prompts a remote user to enroll in a course, log into a course, review course material and become a member of a learning team. The system then allows the learning team to create and modify quiz items and to review the team's quiz items. A quiz item includes a question body, several possible correct answers to the question, and an indicator identifying the best answer to the question. In preferred embodiments it also includes the author's rationale for selecting a particular answer and a means of providing reference information about the item. The system allows each user to modify and update their own quiz items and to comment upon the quiz items of other team members. In some embodiments, the system also allows users to rate the quiz items of each team member. In some embodiments, an expert or instructor can review or comment upon quiz questions, comments by other users or quiz scores. In some embodiments, an expert or instructor can review and invalidate quiz items. The quiz items may then be included in a quiz administered over the computer network to members of a plurality of different teams.

In accordance with a further aspect of the present invention, a method of generating a personalized page accessible to authorized users over a computer network includes the steps of storing a page template in a database accessible by a server processor, receiving user-defined information from a remote processor over a public network and storing the user-defined information in the database accessible by the server processor. With this particular arrangement, a method of storing information in a database and of utilizing the database to provide a page for viewing on a processing system coupled to the server over a public network is provided. In one particular embodiment, a quiz review page for use in a web collaborative training system is provided. The quiz review may be provided in such a way that only certain users are allowed to access the page. Thus, the page is relatively private.

BRIEF DESCRIPTION OF THE DRAWINGS

The foregoing features of this invention as well as the invention itself may be more fully understood from the following detailed description of the drawings, in which:

FIGS. 3, 3A, 4, 4A, 4B, 4C, 4D, 4E, 4F, 4G, 4H, 4I and 5 are exemplary web pages used in connection with a system for implementing collaborative training and online learning over a computer network;

FIG. 7 is a block diagram of an exemplary database structure;

DETAILED DESCRIPTION OF THE INVENTION

Figure 1:
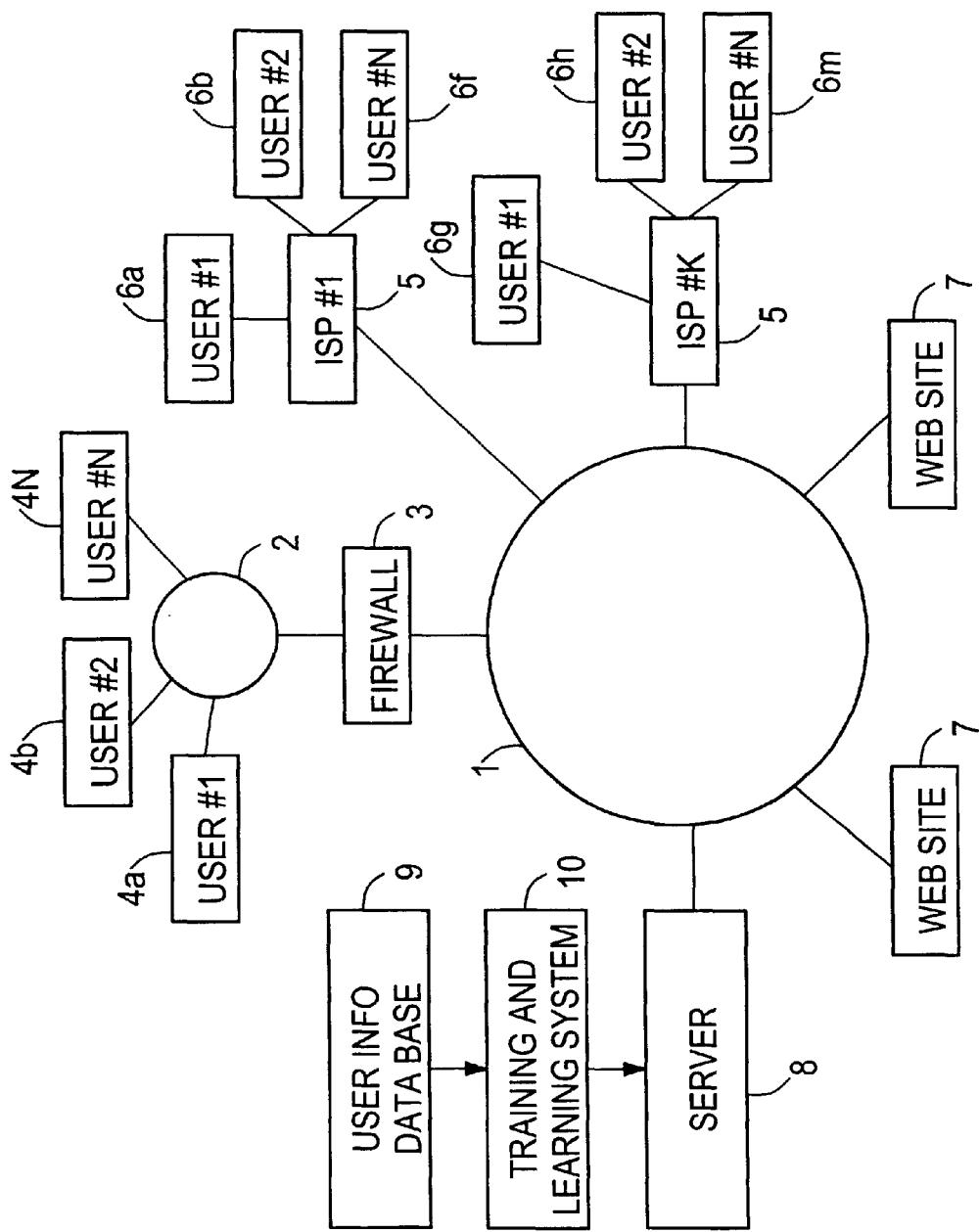
FIG. 1 is a block diagram of a collaborative online learning system operative over a computer network.

The following description sets forth an exemplary embodiment, in accordance with the present invention, of a collaborative training and online learning system for providing a quiz taking capability over a computer network.

Before proceeding with a description of the invention, certain terminology is explained. Reference is sometimes made herein to a Consensus Score. A consensus score for a quiz item is a value which corresponds to the percentage of students taking a quiz that agree with the answer suggested by a question author.

A Power Score/Question Power (also sometimes referred to herein as a Question Power Score or more simply as Power) is a value which represents a measure of the likelihood that a given quiz question is a good predictor of overall student performance. Questions with high power scores are usually answered correctly by better performing students, and usually are answered incorrectly by poorer performing students. The following is one example of an appropriate means to compute Power Score/Question Power.

Based on quiz scores, sort the students from highest scoring to lowest scoring. Choose a number N, which is less than half the total number of students. (For a large number of students, N should be around 27% of the total number, asymptotically approaching 0.5 as the number of students decreases.) Pick the top N students and call this the "High Scoring Group" (HSG); pick the bottom N students and call this the "Low Scoring Group" (LSG). Now, to calculate an indicator of whether a question Q is a Power Question: let HR be the number of students in the HSG who got Q right, and LW be the number of students in the LSG who got it wrong. Then a question is a Power Question if $(HR*LW)/(N*N) >= 0.5$.

Another way to compute Power is:

$$\text{Power} = 0.5(HR/N) + 0.5(1-(LR/N))$$

in which LR is the number in the LSG who got the question right.

It should be noted that in addition to the above examples, many other techniques for computing Power Score/Question Power are possible. As a further alternative, the following index can be used: the Pearson Product Moment correlation between student responses to a particular item and total scores on all other items on the test. Thus, this invention should not be construed to be dependent upon a particular technique for determining item validity. (Also, note that the educational and psychological testing literature contains other usages of the phrase "item validity" that are not the same the meaning here.)

Reference is also sometimes made herein to Raw Rank which is the position in a group of N users based on Raw Score, where the user with the highest raw score is assigned number one (1) and the user with the lowest raw score is assigned the number N. A Raw Score corresponds to the percentage of quiz questions answered by a user in agreement with the question author. A Refined Rank corresponds to the position in a group of N users based on Refined Score, where user number 1 has the highest refined score and user number N has the lowest. In preferred embodiments, in the case of ties, the average of the ranks of the tied values is given. For instance, if the numbers 4, 2, 7, 9, and 7 are ranked, the order is sorted to be 9, 7, 7, 4, 2, and the corresponding ranks are 1, 2.5, 4, and 5. A Refined Score corresponds to the percentage of valid quiz questions answered correctly by a user, where question validity has been determined by the learning system or by expert judgement.

Referring now to FIG. 1, a public network or internet 1 is coupled to a private network or intranet 2 through a fire wall server 3. Coupled to private network 2 are a plurality of users 4a–4N generally denoted 4. As used herein, the term "internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services. The system and techniques described herein can be used on any internet including the so-called Internet.

As described herein, the exemplary public network of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1.

One of the unique aspects of the Internet system is that messages and data are transmitted through the use of data packets referred to as "data grams." In a data gram based network, messages are sent from a source to a destination in a manner similar to a government mail system. For example, a source computer may send a data gram packet to a destination computer regardless of whether or not the destination computer is currently powered on and coupled to the network. The Internet protocol (IP) is completely sessionless, such that IP data gram packets are not associated with one another.

The fire wall server 3 is a computer which couples the computers of a private network e.g. network 2 to the Internet 1. Firewall Server 3 may thus act as a gatekeeper for messages and data grams going to and from the Internet 1.

An Internet service provider (ISP) 5 is also coupled to the Internet 1. A service provider is a person or organization that provides connections to a part of the Internet. Internet service provider 5 utilizes a processing device to couple a plurality of users 6a–6m to the Internet 1. Thus, users 6a–6m are coupled to the Internet through Internet service provider 5. Also coupled to the Internet 1 are a plurality of web sites or nodes 7. When a user wishes to conduct a transaction at one of the nodes 7, the user accesses the node 7 through the Internet 1.

Each node in the fire wall shown in FIG. 1 is configured to understand which fire wall and node to send data packets to given a destination IP address. This may be implemented by providing the fire walls and nodes with a map of all valid IP addresses disposed on its particular private network or another location on the Internet. The map may be in the form of prefix matches up to and including the full IP address.

Also coupled to Internet 1 is a server 8, an information database 9 and a collaborative training and distance learning system 10. Course material information and quiz results can be stored in database 9. The information need only be stored once. The information may be stored, for example, as a record or as a file. The information associated with each particular quiz and/or user is stored in a particular data structure in database 9. One exemplary database structure is described below in conjunction with FIG. 7.

Database 9 and collaborative training and distance learning system 10 may be provided, for example, as an object-oriented database management system (ODBMS), a relational database management system (e.g. DB2, SQL, etc.), a hierarchical database, a network database, a distributed database (i.e. a collection of multiple, logically interrelated databases distributed over a computer network) or any other type of database package. Thus, the database 9 and the system 10 can be implemented using object-oriented technology or via text files.

Figure 2:
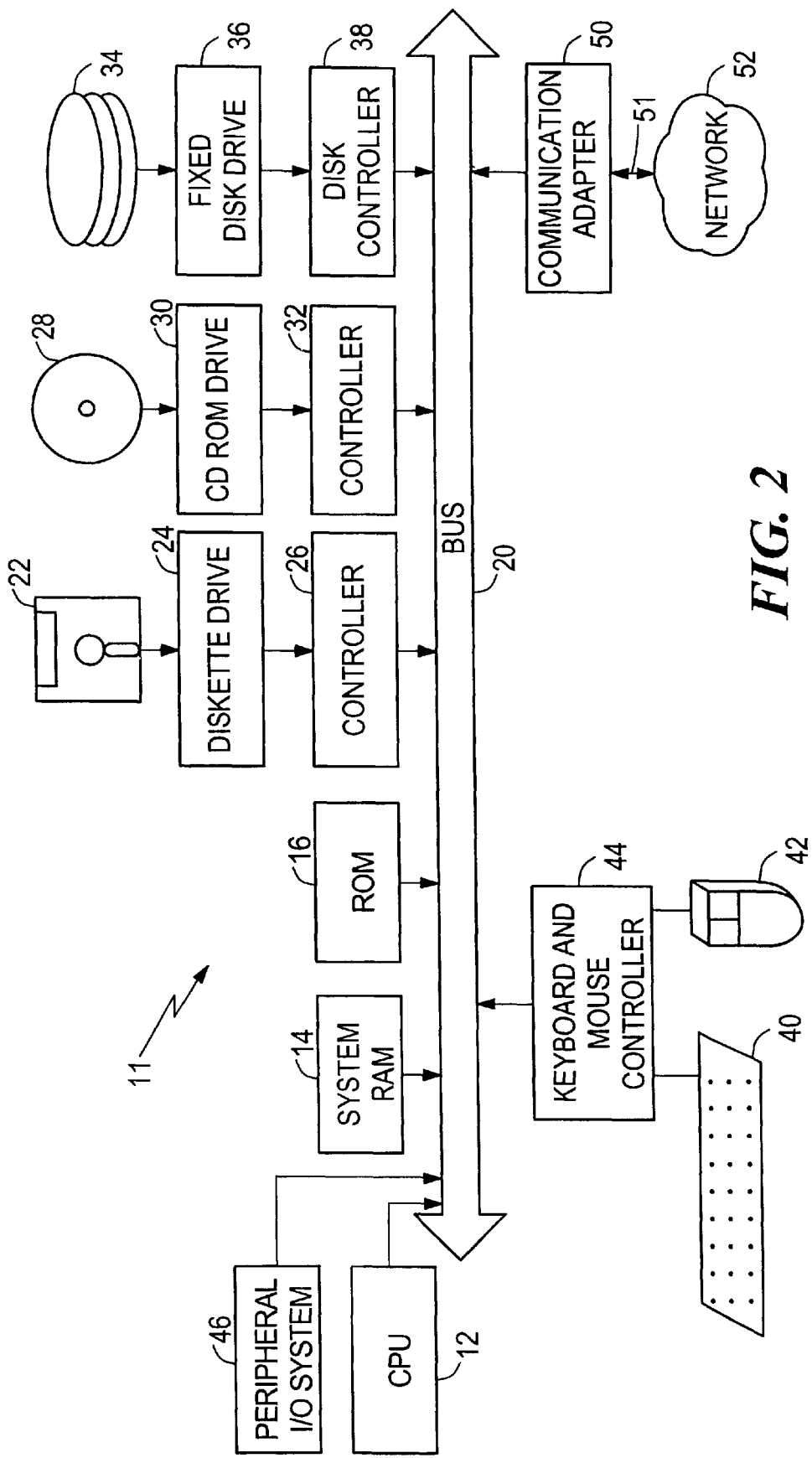
FIG. 2 is a block diagram of an illustrative implementation of a computer system on which the distance learning system may be implemented.

Referring now to FIG. 2, a computer system 11 on which the collaborative training and online learning system of the present invention may be implemented is shown. Computer system 11 may be provided, for example, as an IBM PC compatible computer or an equivalent computer system. The exemplary computer system 11 of FIG. 2 is for descriptive purposes only. Although the description may refer to terms commonly used in describing particular computer systems, the description and concepts equally apply to other processing systems, including systems having architectures dissimilar to that shown in FIG. 2.

Computer system 11 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 11 is generally controlled and coordinated by operating system software. The operating system controls allocation of system resources and performs tasks such as processing, scheduling, memory management, networking, and I/O services, among other things. Thus, an operating system resident in system memory and executed by CPU 12 coordinates the operation of the other elements of computer system 11.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 11 via removable storage media such as hard disk 34, diskette 22, and CD ROM 28. For example, data values generated using techniques to be described below in conjunction with FIGS. 3–5 may be stored on storage media similar to media 22, 28, 34. The data values may then be retrieved from the media 22, 28, 34 by CPU 12 and utilized by CPU 12 to recommend one of a plurality of items in response to a user's query.

Alternatively, computer software useful for performing computations related to collaborative training and online learning methods may be stored on storage media similar to media 22, 28, 34. Such computer software may be retrieved from media 22, 28,34 for immediate execution by CPU 12 or by processors included in one or more peripherals such as communication adapter 50. CPU 12 may retrieve the computer software and subsequently store the software in RAM 14 or ROM 16 for later execution.

User input to computer system 11 may be provided by a number of devices. For example, a keyboard 40 and a mouse 42 are coupled to bus 20 by a controller 44.

Computer system 11 also includes a communications adapter 50 which allows the system to be interconnected to a local area network (LAN) or a wide area network (WAN), schematically illustrated by bus 52 and network 54. Thus, data and computer program software can be transferred to and from computer system 11 via adapter 50, bus 20 and network 52.

Figure 2A:
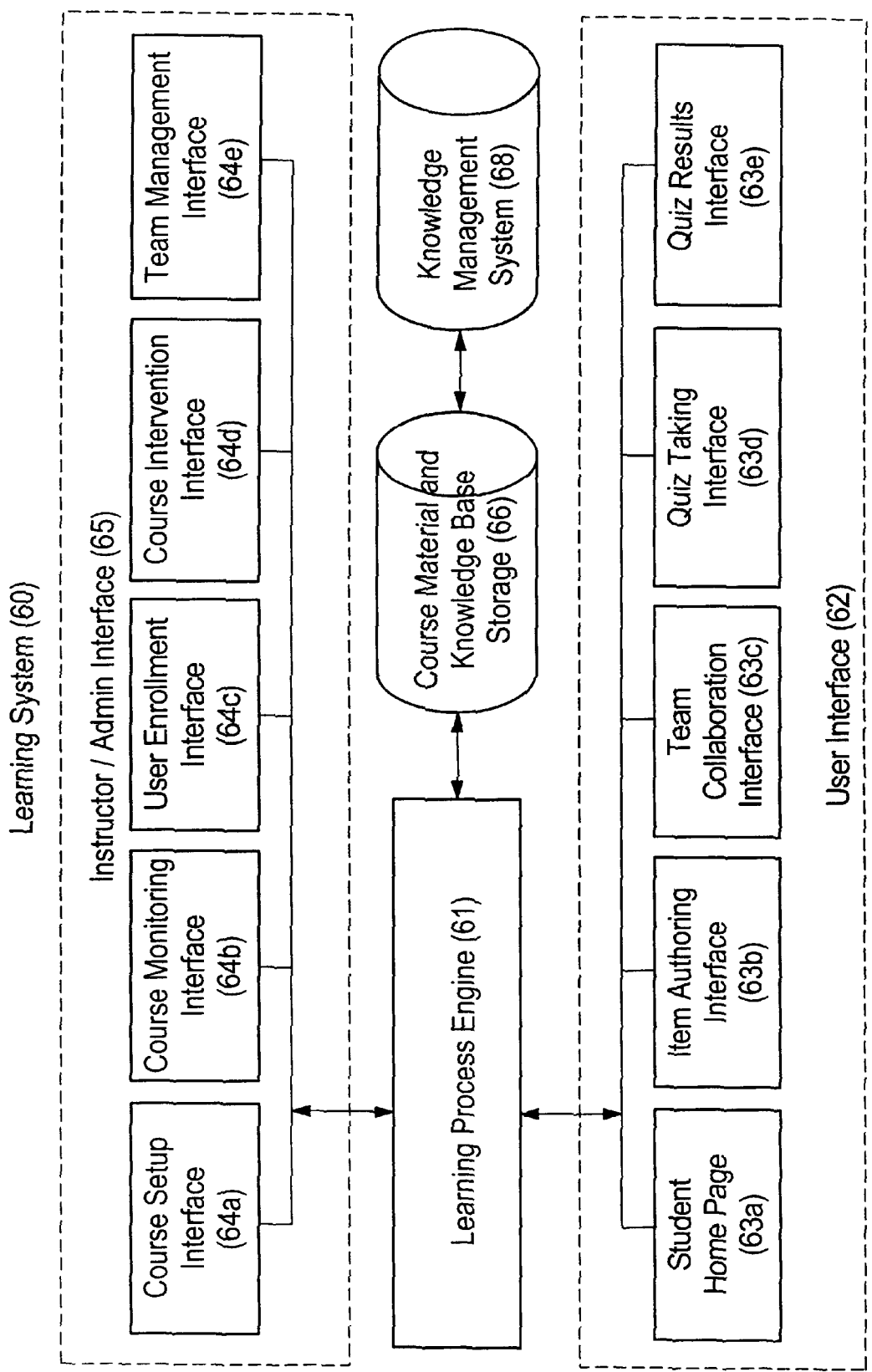
FIG. 2A is a block diagram of a learning system.

Referring now to FIG. 2A, a learning system 60 includes a learning process engine 61 (also sometimes referred to as a quiz processor) having a user interface 62 and an administrator interface 65 coupled thereto. The learning process engine 61 receives information from and provides information to the user and administrator interfaces 62, 65.

The learning process engine 61 provides all the processing logic to support the learning system. The learning process engine will be described below in conjunction with FIGS. 2A and 2B. Suffice it here to say that the specific functions performed by the learning process engine 61 may vary by embodiment, but will include processing functions such as generating dynamic screen displays for each of the User functions 62 or Instructor/Admin functions 65 based on the current processing state of the course overall. Processing is centered around the idea of a learning module or "round".

User interface 62 may be provided for example as a graphical user interface. In a typical embodiment the user interface 62 includes a student home page 63*a,* an item authoring interface 63*b,* a team collaboration interface 63*c,* a quiz taking interface 63*d,* and a quiz results interface 63*e.*

Examples of possible ways in which to implement the interface 62 are shown in FIGS. 3, 3A and 4, 4A–4D as pages 63*a*', 63*b*', 63*c*', 63*d*' and 63*e*'. It should be appreciated that many other possible implementations are also possible.

Also coupled to quiz processor 60 are an instructor/administrator interface 65 which gives a privileged user, such as an instructor or expert, the ability to setup, administer, monitor, and manage the learning process. The instructor/administrator interface 65 may be provided, for example, as a graphical user interface. It includes a course setup interface 64*a,* course monitoring interface 64*b,* user enrollment interface 64*c,* course intervention interface 64*d,* and a team management interface 64*e.*

Examples of possible ways in which to implement the interface 65 are shown in FIGS. 4E–4I as pages 64*a*'–64*e*'. It should be appreciated that many other possible implementations are also possible.

Figure 4:
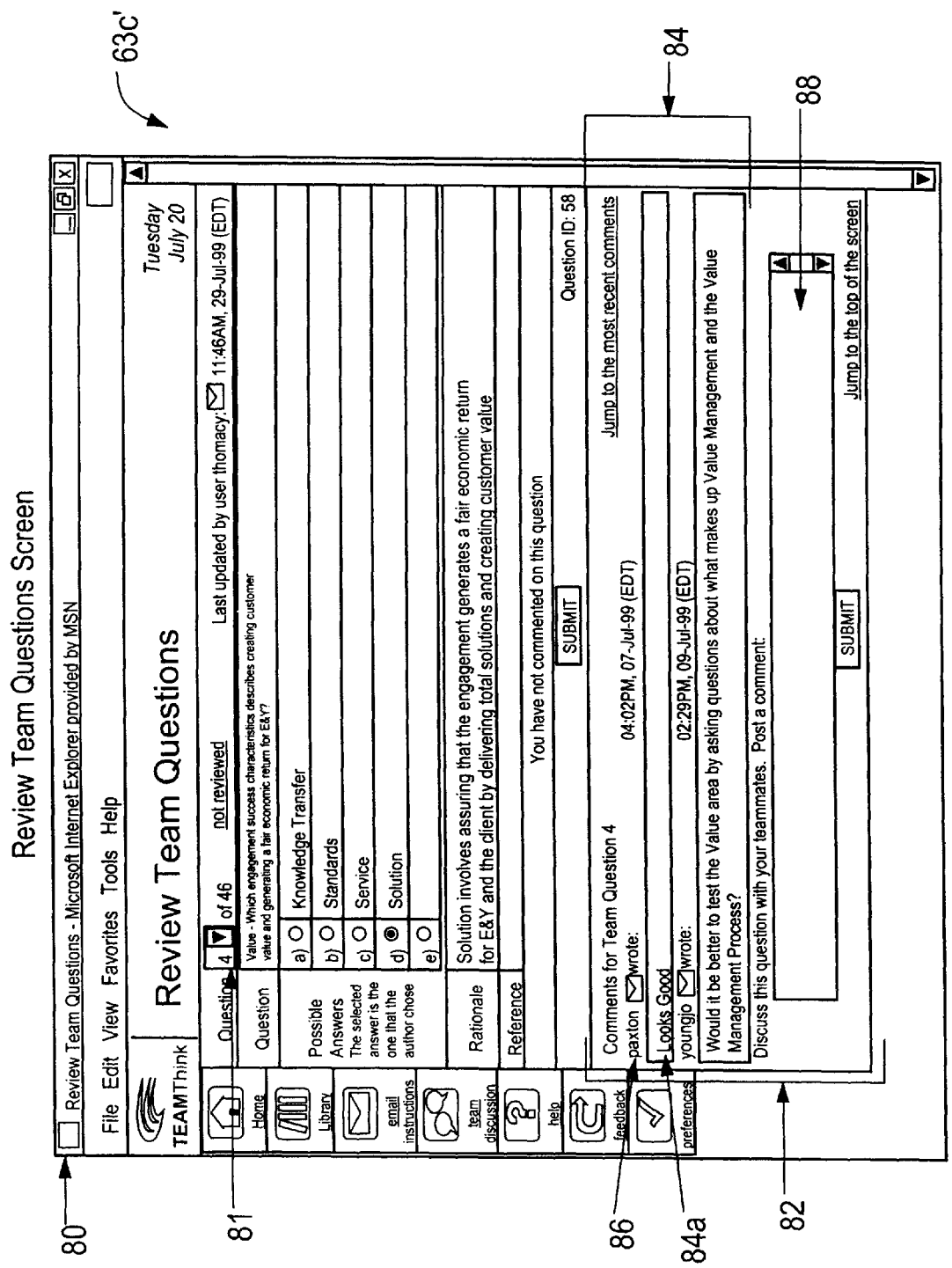
Figure 4F:
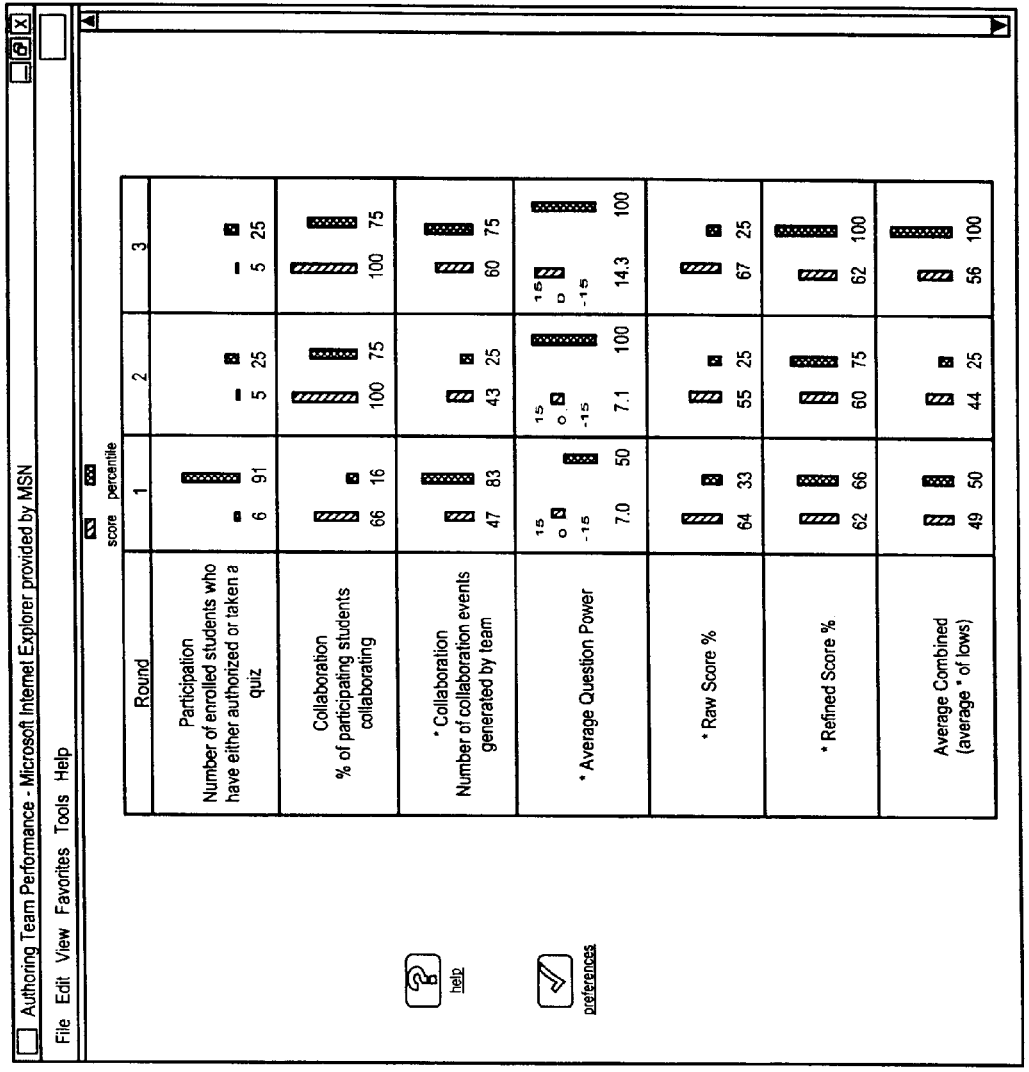
Figure 4H:
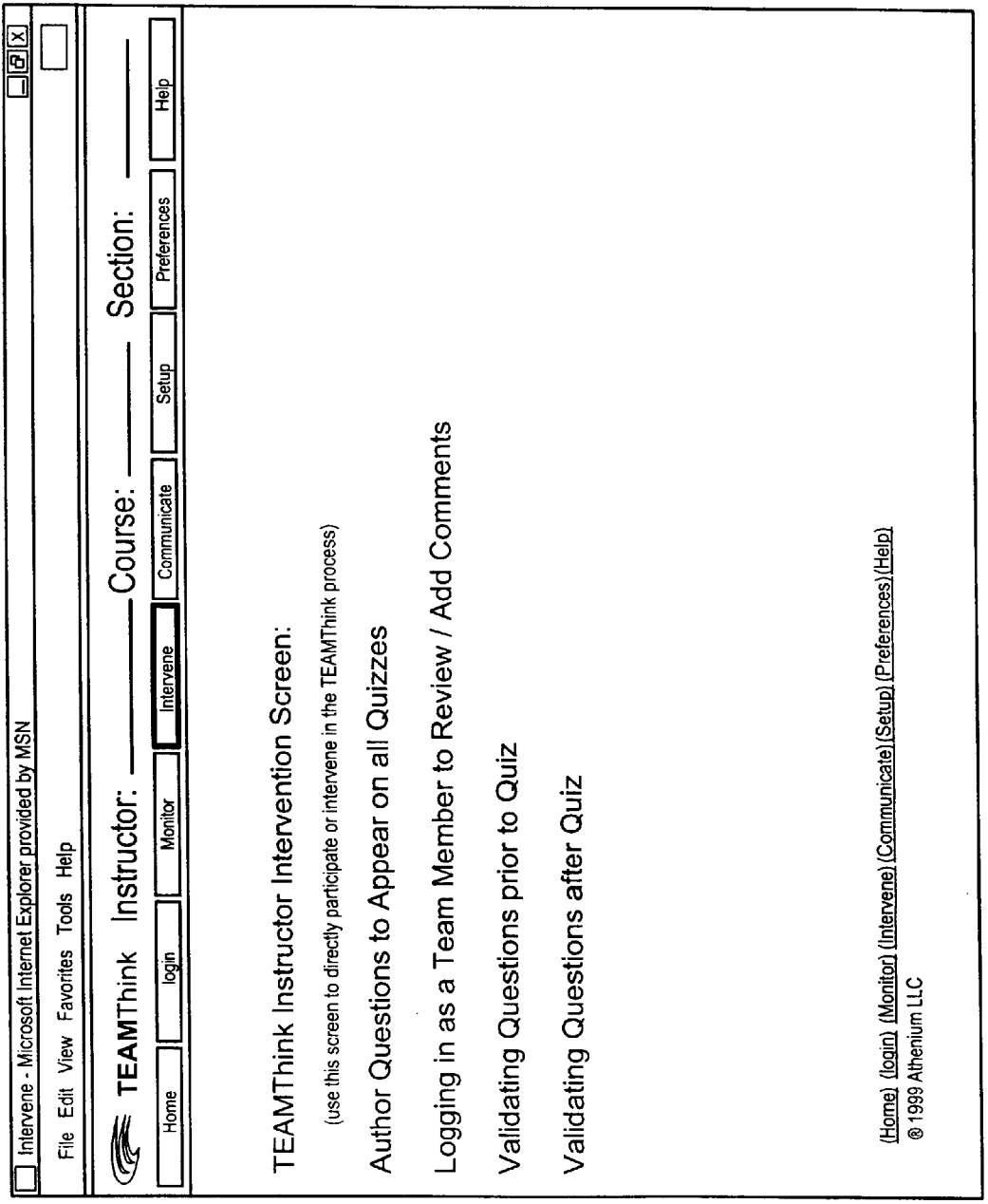
Figure 4I:
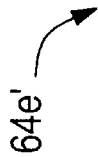

FIGS. 4E, 4F, 4G, 4H, 4I thus contain exemplary instructor features. Of particular note is the course monitoring interface 64*b* (FIG. 4F) and the team management interface 64*e* (FIG. 4I). With the course monitoring interface 64*b* (FIG. 4F), an instructor can rapidly understand the performance of his class, teams within the class, or individual students including measures of participation, collaboration, question power, and quiz metrics. With the team management screen 64*e* (FIG. 4I) teams may be arranged or re-arranged manually or by using a set of predefined assignment functions. Such functions include, but are not limited to, random assignment of students to teams and grouping of teams by previous scores to achieve performance balance across teams.

Also coupled to the learning process engine 61 is a course material and knowledge base storage device 66. Knowledge base storage device 66 receives information and data from and provides information and data to learning process engine 61. The knowledge base is the set of facts, opinions, heuristics and other data about the specific domain task (sometimes collectively referred to herein as information or knowledge). Thus, the knowledge which is elicited from the users (e.g. in the form of the question items generated and question comments provided by the users) via the user interface 62 as well as the knowledge elicited from the instructor/experts through the administrator interface 65 is stored in the knowledge base 66. The knowledge stored in the knowledge base 66 may also include available documentation, regulations, manuals, reports (both written and unwritten) and any other source of information which can facilitate or supplement the knowledge acquisition process.

It should also be noted that while a primary source of knowledge acquisition is via the users questions and answers, other sources and techniques including, but not limited to automated knowledge acquisition tools, may also be used to supplement the knowledge acquisition process.

Knowledge base storage device 66 also receives information and data from and provides information and data to an external knowledge management system 68. The knowledge base 66 also includes a quiz item Question Bank, which is more fully described later in this document. Questions, rationales, and other information can be extracted from storage device 66 and imported to the knowledge management system 68. Thus, knowledge in the form of quiz questions, quiz data, quiz results, etc. may be used by the knowledge management system 68.

The knowledge management system 68 may, for example, collect all quiz items having high Power Scores that are generated by an application of the learning system and index them for simplified search and retrieval for an ad-hoc problem solving application. In this way, knowledge generated by application of the learning system may be automatically made available to other systems.

World Wide Web pages are generally available to any user of the Internet and thus typically provide little or no privacy. Since the Internet allows access by users worldwide, a relatively large number of Internet users exist. The number of persons utilizing the Internet is generally believed to be at least in the tens of millions. With such a large number of users, it is desirable to restrict access to information on some pages or even to restrict access to some pages. The system ensures privacy by allowing access only to authenticated users. A login procedure with passwords is provided for authentication. In some embodiments, the data transmitted over the Internet may be encrypted for greater security.

Figure 2B:
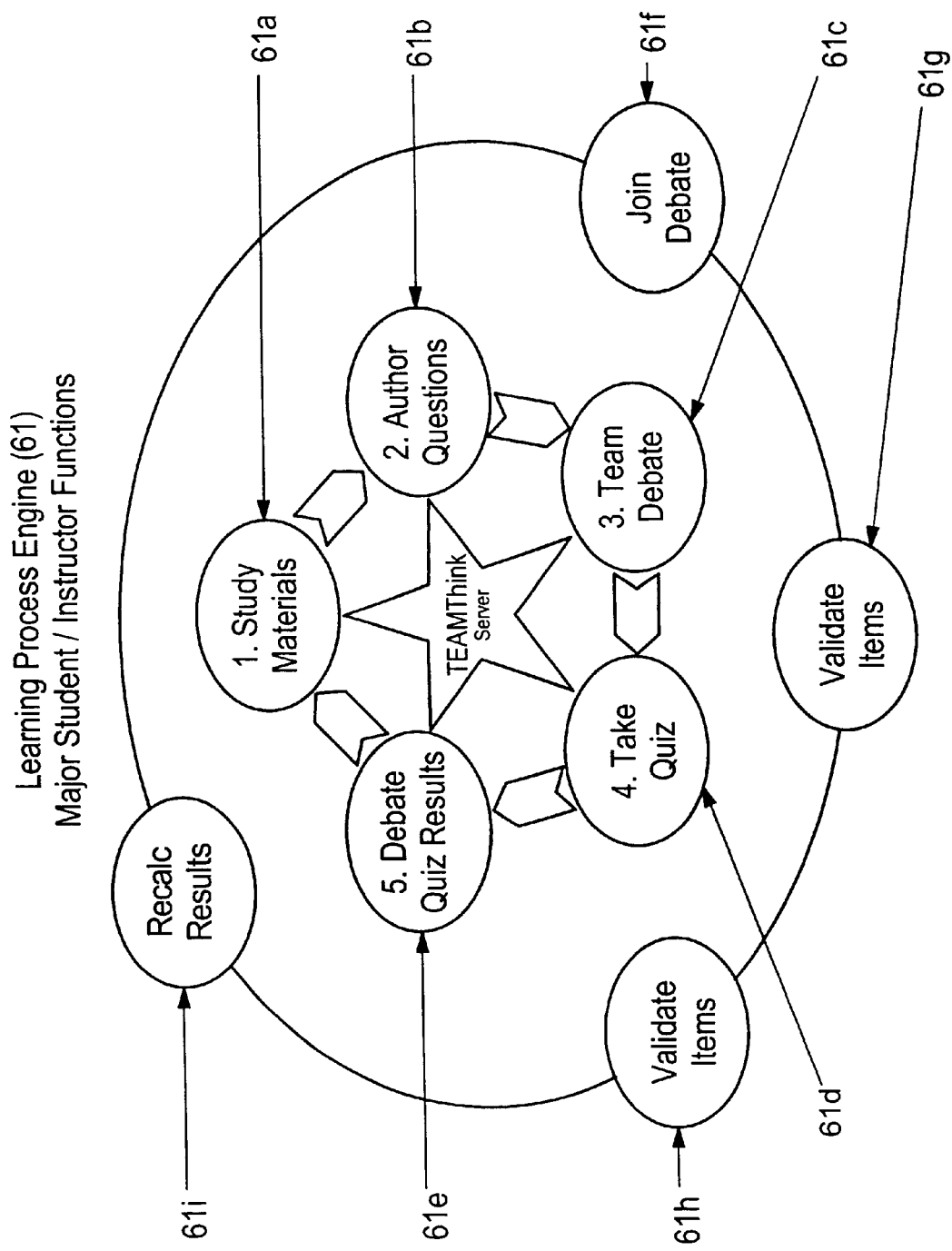
FIGS. 2B and 2C are exemplary views for the Learning Process Engine within the learning system.

Referring now to FIG. 2B, the functions implemented by the learning process engine 61 are shown. Each of the learning system's major student activities: studying materials 61*a*, question authoring 61*b*, reviewing and collaborating on team's questions 61*c*, taking a quiz 61*d*, and reviewing quiz results 61*e* operates on a configurable schedule. A class shares the same schedule and all members of the class have the same deadlines. In the preferred embodiment, students may interact with the system asynchronously, but still share the same deadlines. In some embodiments, the class size may be very small, allowing the process to be scheduled for a small group (as small as one person). Small groups or individuals may utilize the system by accessing questions and data saved from earlier instances of the same course. A full description of this process is described in the Question Bank section, later in this document. Instructors/experts may interact with, monitor, and manage the student activities through actions such as joining a team's question debate 61*f*, validating questions before a quiz is taken 61*g*, validating items after a quiz is taken 61*h*, or causing scores to be recalculated as a result of manual validation or invalidation of specific items 61*i*. These particular instructor interventions are optional and are not required and may not appear in all embodiments. Other instructor functions are described in more detail subsequently.

Figure 2C:
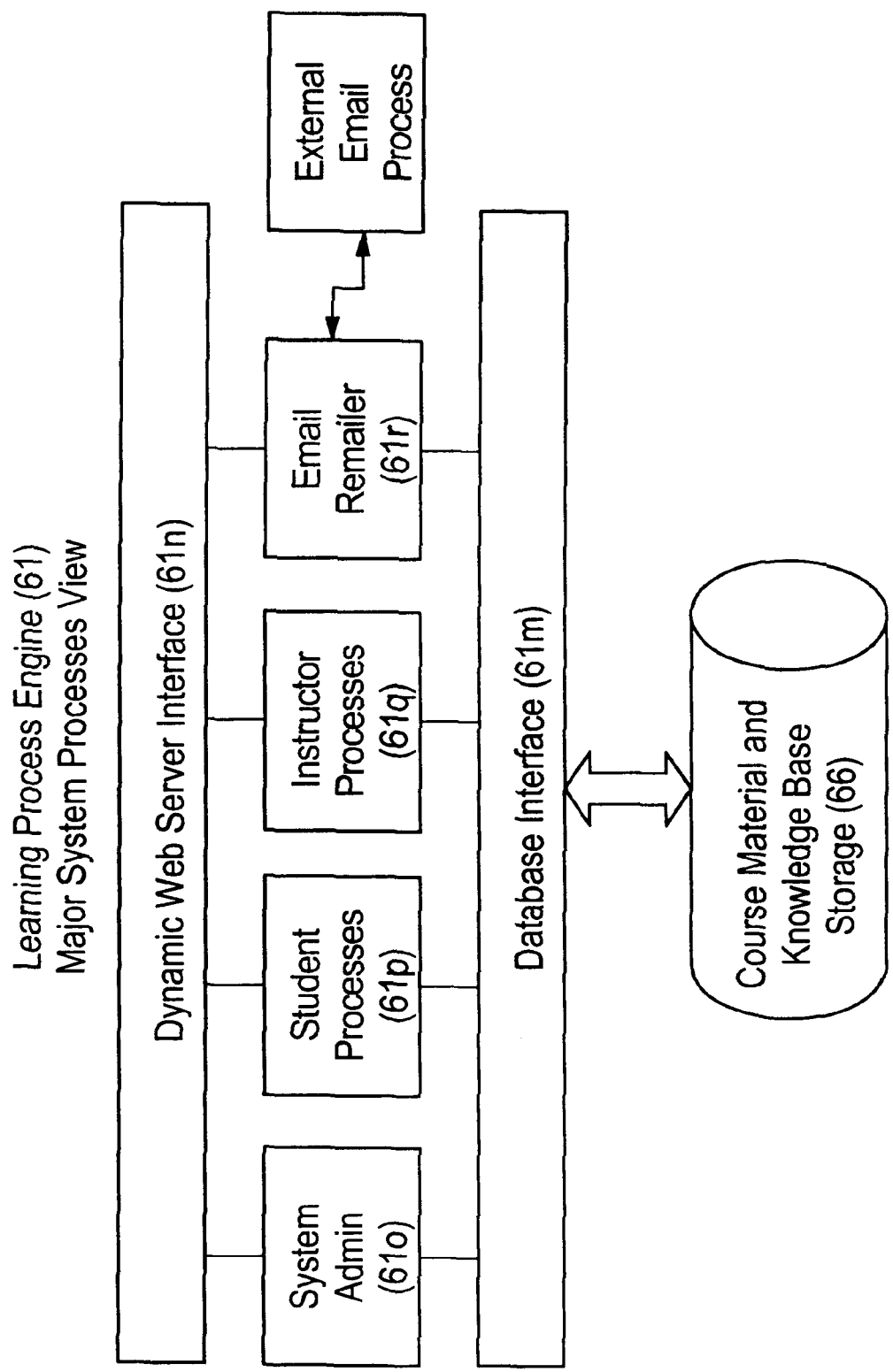

FIG. 2C is another view of the learning process engine 61 illustrating some of the major processing functions in one preferred embodiment. Many other embodiments are, of course, possible. The core processing elements reside on a server platform and utilize a database interface 61*m* to communicate with any of a variety of databases. Some of the significant components include the systems administration processor 61*o* for performing administrative activities like creating courses, administering users, and scheduling course activities. Student processes 61*p* provides all the logic to support student activities as detailed below. Instructor processes 61*q* provides all the logic to support instructor processing, as detailed below. The email processor 61*r* provides the anonymous email facility described below. The major application processes generally communicate with users via a dynamic web server interface 61*n*. This interface allows web pages to be created dynamically to reflect the current state of all data and course processing available to the system and to personalize the experience for each user.

Figure 3:
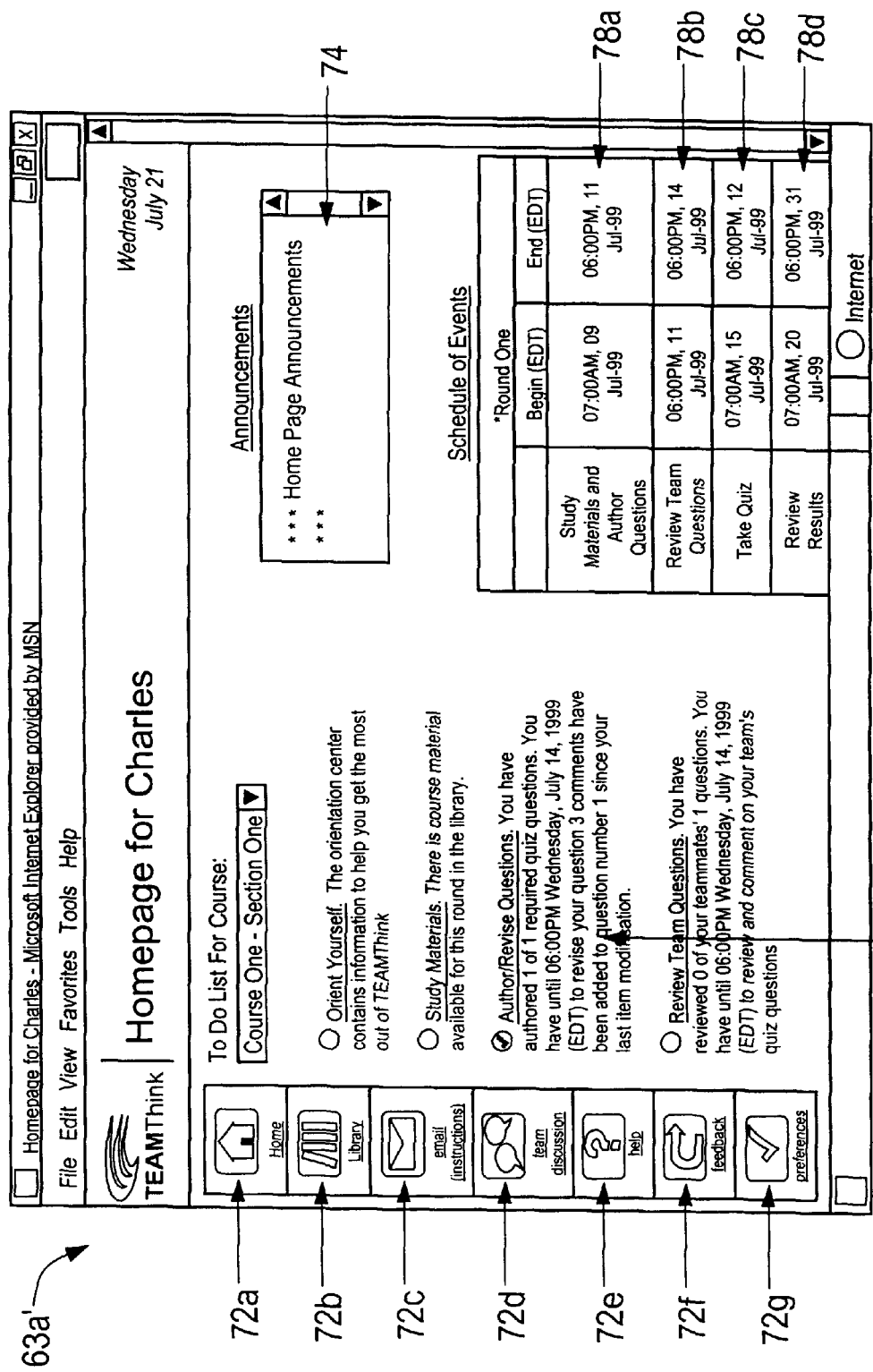

Referring now to FIG. 3, a web page includes a plurality of icons, links (including links to pages displaying quiz questions and links which allow modification of quiz questions) and text which provide information and instruction to a participant, as in 75. This page is also known as the student home page, as it is typically the launching point for all current activity by a student user. Also displayed is tabular information in the form of a course calendar to provide a display of, inter alia, course activities.

As can be seen in FIG. 3, the current round information includes information such as the begin and end dates for each phase of the round including study materials and author questions 78*a*, review team questions 78*b*, take quiz 78*c*, and review results 78*d*.

An announcement window 74 provides current course announcements for all students. Common user functions appear as a set of navigational functions on most pages (72*a* . . . 72*g*). These functions include jumping to the home page 72*a*, jumping to the library (course resource repository) 72*b*, email directly to the instructor 72*c*, general discussions with teammates 72*d*, context sensitive help for the current screen 72*e*, feedback email sent to course administrators 72*f*, and facility to change user preferences 72*g*.

Figure 3A:

Referring now to FIG. 3A, the form for student authoring of quiz questions is illustrated. Required fields include a question entry field 77*a*, an answer field with spaces to enter possible answers to the question 77*b*, a list of radio buttons which permit selection of the correct answer 77*c*, and a space to enter the author's rationale for his selection of best answer 77*d*. Users may optionally provide citations or references to support their questions via the references field 77*e*. Comments may also be added to the question through the comment entry field 77*e*.

Referring now to FIG. 4, a technique for integrating comments with items is explained. The basic concept is to add integrated comments to items, so that items can be discussed by team members during the question authoring process. The terms "integrated comments" or "Discussion Group" refer to the type of software formerly referred to as "Bulletin Board Software". Newsgroups and the discussion areas of America On Line (AOL) and Compuserve are only two of many possible examples of this category of software.

Web page 80 includes an integrated comments area 82. The purpose of adding an integrated comment area 82 to every item is to facilitate "team" discussion and collaboration regarding those items. Integrating user comments with user-generated question items makes it easy to learn collaboratively from others. The users are divided into teams for purposes of item creation and debate. When one user (e.g. Student X) creates a question item, the item is made available only to other teammates to review.

By making each item have its own integrated comments area 82, a very convenient, simple and focused way for students to interact about that item is provided. Every time a student has a thought he wants to share regarding that particular item, it gets added to the list of messages 84.

The unique idea is to add such an integrated comment facility to a quiz question under development, in order to foster the spirit of team collaboration and the spreading of knowledge from one person on the team to another in the process of item development. The same process of integrating comments with items applies also to question authoring, quiz taking and discussion of quiz results. Thus, a quiz item, including the subsequent dialogue about the item becomes a distinct learning object. It contributes to the learning of the users and preserves knowledge and value for future users.

In one preferred embodiment, the entire comment 84a written by each person is appended to the list at the bottom of the page 80, with an indicator or identifier 86 of the author; a space 88 for entering a new comment appears at the end of this list. Indicator 86 allows the user (here identified as "paxton") to receive a reply e-mail. Thus identifier 86 provides a connection, or relationship to an e-mail address. In this embodiment each user is assigned an indicator 86 which is typically not a user name but rather is an anonymous identifier. With this approach, each user can maintain their anonymity. The learning system may provide electronic mail messaging, and anonymous electronic mail messaging, between users of the learning system. This is accomplished by including software in the learning process engine 61q to translate identifiers 86 into participants' actual e-mail addresses for outbound messages and to direct replies through an anonymous remailer to preserve the true identity of all participants. In one preferred embodiment, users can optionally collaborate about individual question items with teammates via anonymous e-mail messages, and their dialogue is automatically recorded in the appropriate fields on the FIG. 4 screens (and associated database fields) as if they had interacted through the FIG. 4 screen.

In some embodiments there are buttons enabling the author to Submit his new comments or Delete or Edit one of his earlier comments. In another embodiment, the writer of a comment can modify it. In another embodiment, only the subject of the comment is listed in the integrated comment area. By clicking on the subject or on an associated button, the user can jump to the comment itself, which (in one embodiment) is in another area further down the page or (in another embodiment) is on a separate page.

In still another embodiment only the first few words or the first sentence or another fragment of the comment is displayed in the integrated comment area; by clicking this or an associated button, the user can jump to the comment itself, which (in one embodiment) is in another area further down the page or (in another embodiment) is on a separate page.

In yet another embodiment, the comments are organized according to "threads" as is commonly done by "newsreaders" which provide access to the Usenet. To facilitate this, writers of comments can be presented with buttons or icons (in one embodiment) which are provided to reply to an existing comment, as differentiated from starting a new thread by posting a new comment that is not a reply. Those of ordinary skill in the art will appreciate, of course, that other means including, but not limited to links and other control or functional mechanisms, may also be used to facilitate the provision of comments by writers.

In some embodiments, a facility is provided wherein an instructor is enabled to login as if he was a student on a particular team. In further embodiments, his activities are restricted in various ways. In one embodiment, for example, the instructor can write comments, but cannot generate questions.

In some embodiments, an instructor who writes comments is given the means to specify whether his comments will be anonymous or not. If anonymous, some embodiments "identify" him with a random pseudo-ID, others by other means including but not limited to a user-selected fictional name. In still other embodiments, the instrutor is not identified at all. If the instructor is not anonymous, the instructor's comments are highlighted and/or clearly marked or otherwise identified as being from the instructor.

In some embodiments, there is an administrator or instructor-settable option to automatically eliminate comments and/or questions and answers (in various embodiments) when a round is complete. This helps people feel less intimidated that their employers may eventually see the text of their comments, questions, and answers.

In preferred embodiments, there is an administrator or instructor-settable option which allows the answer to a question to be hidden from a student. When this option is enabled, students who are reviewing their teammate's questions, are not immediately shown the author's answer to the question. This feature requires the students to select the best answer before the author's correct answer choice and rationale are revealed. A means is presented on the screen for the student to then cause the answer to be revealed. Such means can be provided for example as a checkbox or other equivalent input means. This sequence is helpful for judging how difficult others will find the question.

Items are reviewed by teams as a whole, including team-generated discussion and ratings for each item. But students are also grouped into pairs for purposes of sharing the Question Power Score. Students are made aware of this when they begin using the system; and at the end of each round, scores are calculated accordingly.

In this technique, an item is created by an individual student and in one embodiment only an individual student can modify an item. When the author deems his item to be ready for teammates to review, the author submits his item for review by teammates by making the item available to the teammates. This can be accomplished, for example, by pressing a "submit" button, which transfers the item to a region of the knowledge base store or other storage device accessible by teammates. Alternatively the item can be made available to the teammates by simply transmitting the item to the teammate (e.g. as an attachment to an e-mail). Alternatively still the item can be made available to the teammates by changing a security code associated with the item (e.g. changes a code from "private" to "team public." In some embodiments the most recent version of the item as well as prior versions of the item can be made available to the team. After receiving the item, other team members can then rate the item or add a comment to the integrated comment list.

It should be noted that in some embodiments it may be desirable to allow more than an individual student to modify an item. It may, for example, be desirable to allow other students, instructors, or just the author's pairmate to modify an item.

The pair-oriented part of the process comes at three or fewer points, depending on the embodiment. The first point is when a student registers to participate in the learning system, the software displays the student ID of his pairmate, and tells him that his Question Power score, which is one of the indicators of success in the course, will be shared with his pairmate. They will have the same Average Question Power. Thus each student is motivated to make sure that his pairmate's items have the greatest possible Question Power.

The second point is during item authoring, when pairmates may view and edit questions together, prior to submitting their work to their team.

The third point is after the quiz is taken. At this point, the Question Power of items generated by both students in the pair are averaged together and displayed on the View Quiz Results page and any other quiz result output which shows the Average Question Power for each student.

Most embodiments provide a means to facilitate communication between pairmates. In the preferred embodiment, a button exists on every page which enables the user to quickly bring up an email window to send email to his partner. In other embodiments, such a button may appear on an always-present frame, or may appear elsewhere. In yet other embodiments, there are "comment areas" or "discussion software" for the sole purpose of facilitating discussion between partners. In some embodiments, these discussion areas are of the type commonly known as "threaded discussion" as seen in the Usenet. In some embodiments these comment or discussion areas exist, and the special anonymous email facility does not. Also, in the integrated comment area, the preferred embodiment has a special display for comments written by the viewer's partner (in the preferred embodiment, the text "Your partner wrote:"; other embodiments may indicate this using different means or not indicate it at all.

It should be noted that "pairs" do not necessarily consist of two people; in other embodiments the concept can be renamed to "partnerships", "co-authoring groups" or something else; the person or people referred to as "pairmate" above may be renamed to "partner", "co-author", or something else.

It should also be noted that, in some embodiments there are additional "comment areas" or "discussion groups" that are available for access by all members of a team; one for each team. In some embodiments there is an additional "comment area" or "discussion group" for Groups and/or for the class as a whole.

Figure 5:
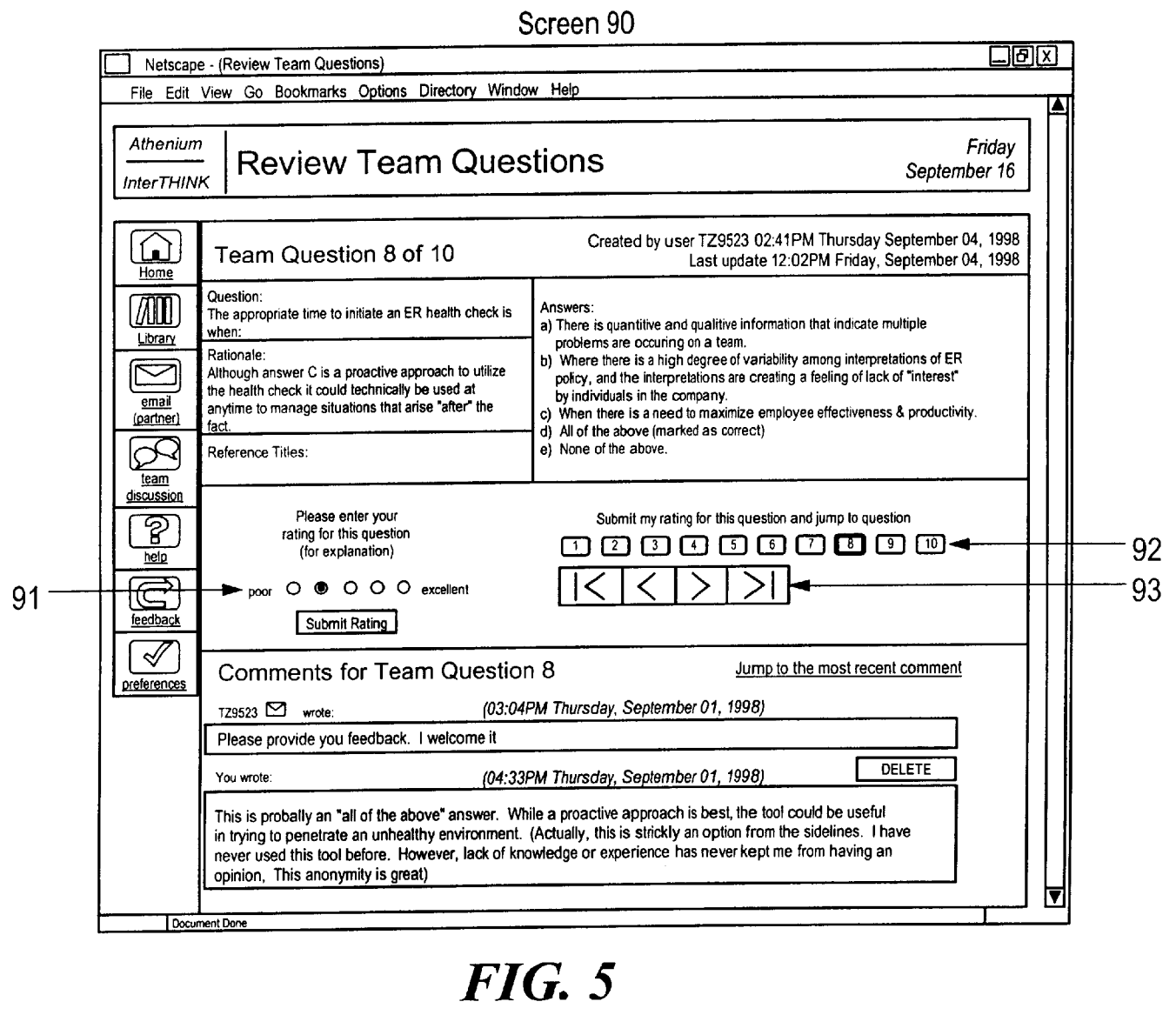

Referring now to FIG. 5, a review item screen 90, includes 5 radio buttons appearing on he Review Team Questions screen 91, allowing users to input ratings corresponding to 5 degrees of goodness between "poor" and "excellent". Authors and teammates can view the ratings to date, as a way of knowing how good the items are perceived to be at that point in the authoring process. In other embodiments, there are other numbers of radio buttons; in one embodiment, a slider is used that enables the user to generate a floating-point rating between 0 and 1; in another embodiment, the range of the floating-point output is programmer-configurable; in another embodiment, a "ratings bar" is used that enables the user to click on any point in the bar to generate a floating-point rating. In another embodiment, a checkbox is used that enables the user to specify that the item is of higher than average goodness; this is indicating by checking the checkbox; in another embodiment, a check has the opposite meaning.

In one embodiment ratings are combined by arithmetic averaging; in another embodiment, geometric averaging is used. In another embodiment, a Bayesian estimator of future ratings is used. In some embodiments, ratings are preprocessed so that they are uniformly distributed in accordance with the techniques described in U.S. patent application Ser. No. 08/848,317 filed on Apr. 30, 1997 now U.S. Pat. No. 5,790,426 assigned to the assignee of the present invention and incorporated herein by reference. In some embodiments, combined P-values are generated by interpreting these uniformly distributed "ratings" as P-values, P, and combining them according to multiplicative, additive, or other known techniques from the field of meta-analysis. In one preferred such embodiment, (1-P) is used as the P-value to be combined; this is an indicator that an item is likely to consistently rated highly. An appropriate technique is described in the above-referenced U.S. Pat. No. 5,790,426.

The system also includes navigational controls. Each question is assigned a numbered button (i.e. numbered buttons for each question). This navigational enhancement enables people to quickly jump from one question to any other. On each item display screen, there is a row of numbered buttons 92. There are as many such buttons as there are items. The user can press any of those buttons to be moved to the corresponding item.

The system also includes directional controls analogous to those on a tape recorder or other type of recording instrument 93. When positioned at a particular item, in the preferred embodiment the user can move backward or forward by 1 item in the list by pressing the button containing the arrow pointing in the desired direction; or he can move immediately to the end of the list by pressing the button with combined arrow and vertical line, reminiscent of tape recorder controls.

Other embodiments may be missing some or all of these four buttons (in the latter case, navigation would depend on the numbered buttons mentioned above, or on other means). Other embodiments may use pull-down lists to navigate directly to any item.

In the preferred embodiment, when the user gets to the end or beginning of the list using the single-step controls, he moves immediately to the opposite end (the lists "loop around"). In other embodiments, users might get no response when they are at the beginning or end of the list, or they might get a warning message saying, for instance, "You are at the end of the list; no more movement is possible in that direction."

In preferred embodiments, the system contains automatic navigation features. In some such embodiments, when a user needs to traverse a list of items where some of the items may have already been processed, the system will automatically proceed to the next unprocessed item when the user navigates to the next item. When the list is fully processed, the system will automatically navigate the user to the home page to select another task to perform. In addition, in some embodiments, when a user has processed all the items once, this automatic navigation feature is turned off, so that after re-processing an item, the automatic navigation is to the next already-processed item. This is helpful, for instance, for encouraging users to write at least one comment for each item, but letting them thereafter concentrate on the items of most interest.

The system also facilitates knowledge generation. The collaborative learning process can generate knowledge which will be of later use by saving material written by students during the learning process to a separate file or files, where it can be input into a knowledge management system or can be used as study material for subsequent users of the learning system. In some embodiments, the best knowledge from each course is automatically made available to subsequent learners, resulting in dynamic knowledge generation from the learning system.

The system also allows implementation of a quiz score sharing technique. In this technique, students are assigned a partner with whom their learning systems scores will be shared. (That is, the scores from a quiz, where students answer questions written by other students, are shared). Therefore, for a student to score as highly as possible on the quiz, he is motivated to help his partner. He thus is motivated in a direction that will speed knowledge sharing and encourage him to teach and collaborate.

Additionally, since communications in an online medium is typically in the form of text, the communications in which students teach each other may be captured. Due to the scoring system, students are motivated to write in such a way that the understanding is communicated as clearly and painlessly as possible. This increases the likelihood that material will be generated that may be re-used in a knowledge base or other applications.

Finally, this methodology has the benefit of providing a push in the direction of wide ranging study and knowledge sharing regarding the content, particularly when compared with the prior art (sharing average item power). By sharing quiz results, the collaborative effort is placed where it will maximize broad learning. A pair of students can create powerful items by devoting most of their time and energy to one small part of the content, attempting to create a set of powerful questions all in that one area. In contrast, by sharing quiz scores, the benefits of collaboration are introduced to the area in which maximal achievement is the result of broad learning, not learning that is limited to one particular area. In addition, by virtue of having his quiz scores shared with his partner, a student is motivated to help his partner in any content areas in which his understanding is superior to his partner's. This brings about an equalizing tendency—each player is motivated to share his knowledge and understanding in the areas where his knowledge and understanding is superior. Each individual student's knowledge gaps have an increased chance of being filled in by his partners.

This process comes into play at three or fewer points, depending on the embodiment; different embodiments may exclude any or all of these points.

(A) When a student registers to participate in a course using the learning system, the software displays the student ID of his pairmate, and tells him that his quiz score, which is one of the indicators of success in the course, will be shared with his pairmate. In other embodiments, the students are grouped in larger numbers than pairs; their partners are then referred to as "partners" or another term.

(B) After the quiz is taken, the quiz scores of items generated by both students in the pair are averaged together and displayed on the View Quiz Results page and any other quiz result output which shows the quiz results for each student. In one embodiment only Refined Scores are combined; in another, only Refined Ranks are combined; in another, only Raw Scores are combined; in another, only Raw Ranks are combined; in others, a two or more of these data points are combined. By "combining", what is meant is averaging by arithmetic or geometric means, or any other combining method that is found, through quizzing or other means, to be better at motivating students to help each other or to achieve other ends. For example, in the one embodiment, the learning system provides a means to balance the individual's need to personally excel with a possible learning objective of motivating him to help his partner. A preferred approach is to weight the two scores in the averaging process so that the students own score is weighted more or less highly depending on the importance of individual or pair performance.

For example, if the goal is motivate helping behavior, the system might weight the partner's score highly; if it is to motivate individual achievement, the system might weight the individual student's score more highly. In some embodiments, groups of more than two students can have their scores combined. In this case the system might weight the individual student's highly enough such that it is greater than or equal to the significance of all his teammates combined. Alternatively, the individual students score can be made less significant.

In a preferred embodiment, an individual's score is weighted to be equal in significance to that of all of his partners combined; this provides a good balance between helping and individual achievement behaviors. In some embodiments of this invention, these weighing techniques are applied to combining Question Power in addition to applying them to quiz scores; in others, these weighing techniques are applied to combining Question Power instead of quiz scores.

(C) Convenient means is given for communication with the partner. In the preferred embodiment, a button exists on every page which enables the user to quickly bring up an email window to send email to his partner. In other embodiments, such a button may appear on an always-present frame, or may appear elsewhere. In other embodiments, there are "comment areas" or "discussion software" for the sole purpose of facilitating discussion between partners. In some embodiments, these discussion areas are of the type commonly known as "threaded discussion" as seen in the Usenet. In some embodiments these comment or discussion areas exist, and special email facility does not. In some embodiments, (c) is not present.

In some embodiments, some or all of the quiz questions come from sources other than fellow students. For instance, the quiz questions may be generated by an instructor or originate in earlier learning system rounds.

For purposes of improving knowledge sharing along with creating reusable knowledge for input to a knowledge management system or reuse within the learning system itself, some embodiments include a means of rating each comment and/or each email message. In some embodiments, ratings buttons or other means of ratings input as described above are added to the e-mail messages or comment displays. The addition of ratings means to e-mail is dependent on the particular e-mail configuration available to the users. Microsoft Outlook, for example, currently provides a means for rating email messages, while many other e-mail clients do not. In embodiments involving HTML or XML-capable email systems, ratings input can be added by means of HTML or XML attributes; other technical means are also possible.

Through the rating input facility, every communication has the potential to be rated as worthy of saving as knowledge. In some embodiments, the ratings input means is given very specific language which pertains to the knowledge generation purposes. For instance, in one embodiment, the input means is a simple checkbox with the legend: "This comment is suitable to standing alone as part of future study or reference material."

In some embodiments, special text input and display fields are provided for stand-alone instructional material to be entered by students and read by other students. In some embodiments these are the only fields which are considered for reuse. In some embodiments, very specific onscreen instructions are given for the use of these fields, for instance, students may be informed that the area is for instructional pieces that can stand independently, and that the entered text will be not only displayed to fellow students in the current round, but also considered as candidate text for reuse. In some embodiments, ratings input means is provided.

In some such embodiments, knowledge generation can occur in the following manner. When students create quiz items, a space is provided in which they can write the rationale for their question and answer. This rationale is an explanation of the reasoning used to arrive at that answer or why that answer is the correct answer. To motivate the writer into providing rationales that can be reused as standalone knowledge, other students are allowed to rate rationales regarding their applicability for later reuse, and the system includes a scoring mechanism based on the rating which provides an additional metric(other than Average Question Power and individual quiz scores), for measuring the achievement of an individual student.

When users are reviewing their quiz results, they are presented with ratings input means (see above) which allows them to specify the goodness of the rationale, considered separately from the goodness of the item as a whole which was generated during the item-creation phase. Users are instructed to understand that the "goodness" of a rationale is based on its ability to stand alone as an article of instruction or as an explanatory article that could be used in reference materials. In one embodiment, this instruction is presented onscreen in text form. In another embodiment this instruction is presented in separate orientation materials. The ratings given by the quiz takers are combined (see above) and presented as a third component to the student's achievement measure. In some embodiments, an additional technique is used to motivate students to carefully consider the ratings they give, and that adds a 4th component to the achievement measure. This technique is to measure how well each rating tends to correspond to that of the majority for the given rationale. In one embodiment, the average rating for each rationale is computed. Also computed is each student's correlation to this average rating when considering the same ratings from all students.

In another embodiment, correlation techniques can be used to measure how well the ratings correspond to the ratings supplied by members of the HSG (High Scoring Group), again by using correlation. In other embodiments, other techniques such as positive deviation from the class mean are used. The rationales that are determined to be the best, according to the ratings, are then exported for use as training and/or reference materials. In preferred embodiments, students who have yet to enter their ratings are not presented with the ratings of others; by this means students are forced to use their own opinions in ratings rather than being influenced by (or every copying) other people's ratings.

In addition to the use of rationale's as knowledge, reference sources cited by users (e.g. URLs or other reference descriptions entered by users) are also a valuable source of knowledge. These references may be not previously known to the creators of the course. In addition, by tabulating the number of references to specific works, knowledge is created about the relative value of those works. Works that are particularly valuable will be referenced more frequently than those that are less valuable.

Knowledge which is captured by the above means is used for various purposes. In some embodiments, this knowledge is exported and used as input to a separate knowledge management system, of which there are many in the marketplace today. In other embodiments, the knowledge is integrated into the course materials for future study by other students.

In some embodiments, a means of rating the question item in its entirety is provided. In preferred embodiments, on-screen instructions are given which are oriented toward the purpose of reusing the items as study materials and for possible integration in future quizzes. For instance, in one embodiment, a legend is displayed which labels the highest rating as "This question is very instructive and would be an excellent candidate for future quizzes."

The system can also include expert moderation. In some embodiments, it is desirable to provide an optional feature to allow an expert moderator to check the correctness of questions (e.g. by reviewing facts, rationale and other information related to the questions and associated answers), and other issues.

At the end of the Question Authoring Phase, and before the Quiz Taking Phase, an expert can review the items using the same user interface as students use to review their teammate's items. (In some embodiments, a different user interface may be used; all such user interfaces provide access to the items generated by the students). In the preferred embodiment, the expert can reject items that he deems to be of such a nature as to interfere will the learning system learning process or that raise other problems, such as liability concerns. "Rejected" items will not appear on any quiz. In some embodiments, the expert can change items, such as rewriting the question text or possible answers (foils), and changing the assignment of the correct answer to one of the other foils.

In some embodiments, the system automatically determines item validity (items which will count on a user's quiz) by a defined procedure using power scores, item consensus, or other measures. In these embodiments, the expert may optionally override the validity decisions of the learning system. This may occur at any point after a quiz has been taken and will affect the items to be included in scoring the quiz. A means is provided to recalculate all the quiz scores, power scores, rankings, and other measures which depend on the set of valid items on a quiz.

In some embodiments, the expert can add his own editorial comments to an item, which would coexist with the rationale in item displays. In some embodiments, this occurs during the Question Authoring phase; in some embodiments, this occurs in the View Quiz Results phase; in some embodiments this occurs in more than one phase or in other phases, such as between the Quiz Taking phase and the View Quiz Results phase.

In still other embodiments, the expert can insert his own items to a round if he feels that the collection items created by the students are inadequate in some way. In still further embodiments, more than one expert can be used in a given round.

The expert activities mentioned here may occur at any time in the process, depending on the specific embodiment, not just the times mentioned.

The use of quizzes to measure learning and encourage performance makes it desirable to validate the questions used in the scoring. In most embodiments of the learning system, students create a great majority of the questions appearing on the quizzes. Mechanisms must be provided to validate questions used in scoring. Items that are invalid do not count toward scoring of quiz performance.

In preferred embodiments, three separate mechanisms are used to determine item validity. The first mechanism can be referred to as Instructor/expert review and elimination prior to quiz formation. In this mechanism, instructors or other designated experts have the opportunity, prior to assembly of quizzes, to review and mark as invalid any question generated by any student. Questions so marked will not appear on any quiz and are effectively eliminated from further consideration.

The second mechanism is referred to as automated validation. In this mechanism, after a question appears on a quiz, which is taken by a predetermined number of students (e.g. ten or more students), enough information is generated for the learning system to automatically validate each item. The Question Power Score and Consensus Score is calculated for each question appearing on the quiz. If either of these scores exceed established threshold values (system parameters), then the item is marked valid. A student's quiz score is her percentage of correct responses on valid questions. Invalid questions are dropped from scoring.

The third mechanism is validation by expert review of post quiz debate. In this mechanism, after students receive their quiz results, they also will see which questions have been invalidated. Since their performance depends on achieving good quiz results and good authoring performance, each student will generally closely examine any valid question they got wrong and any invalid question they got right. If they feel the automatic validation process is at fault, they have the opportunity to comment and debate their viewpoints, in the hope of overturning the automated validation process to improve their score. Similarly, students are motivated to argue why any invalid question authored by them should be valid. This debate regarding the possible erroneous validation of items adds to the learning and provides significant input for a possible validity review by the course expert/instructor. Such an expert/instructor has the authority to reverse the validation judgements made by the learning system and to cause all quiz or Question Power scores to be recalculated. Facilities are provided in the learning system to facilitate the review of validity debates, to over-ride the validity judgements of the learning system, and cause all scores to be recalculated.

In other embodiments, some or all of the above-mentioned validation mechanisms may be missing or may take a different form. In particular, the algorithm for automatically determining item validity may take a different form, such as the use of Consensus Scores only or Power Scores only for determining which items are valid.

In some embodiments, questions are assigned to categories. In the preferred such embodiment, categories are assigned by the author at the time a question is created. In other embodiments, instructors can create categories. A course on desktop computer systems, for example, might include categories for CPUs, monitors, keyboards, Local Area Network (LAN) connections, disk drives, etc.

In preferred embodiments, categories for a question are chosen by means of pull-down menus from a list of available categories. Other embodiments involve other means, including but not limited to typing in category names or selecting a category by clicking on a "radio button" (radio buttons are standard interface objects) to select the category displayed next to that button.

In various embodiments, categories for a course are created by the instructor at course creation time and/or created or modified at other times; or categories are included by a vendor in pre-packaged learning system courses, often accompanied by specific course material and sold or leased to a customer. In preferred embodiments, input means are provided for assigning weights to the various categories according to their importance. Instructors or subject experts typically assign the weights based on their understanding of the relative importance of categories to the desired learning objective.

In preferred embodiments, the category of each question is displayed to the student's team so that that category choice can be debated as part of the team discussion regarding the question. In some embodiments, the instructor can invalidate questions solely because the author picked the wrong category for a question; this provides motivation for the students to pick categories correctly.

In many embodiments, a user interface is provided so that a listing of all categories covered by a particular team or quiz is readily available to users. In further embodiments, the categories missing from a particular team's work or particular quizzes are automatically displayed or highlighted. One role filled by such displays to enable an instructor to quickly pinpoint situations where a particular category is not fully covered. Then the instructor can write comments or send emails to the team saying that they need to cover the uncovered areas. The effective use of categories helps ensure all topics deemed important by a course designer, expert, or instructor will actually be covered by a team or set of teams. In some embodiments, the instructor can add questions to the system that cover categories that are not sufficiently covered.

In some embodiments, categories are used in quiz generation. The learning system can generate quizzes that provide an adequate number of quiz questions covering each subject category, if possible. In basic embodiments, questions are chosen at random to form quizzes. In most such embodiments, the restriction exists that the quiz taken by a given student doesn't include questions authored by the student's own team. In some embodiments that include categories, the further restriction is made that questions are allocated to quizzes such that the broadest possible coverage of categories is included on each quiz. In preferred such embodiments, questions in categories which include a smaller number of questions than there are quizzes that need to be generated are duplicated from quiz to quiz such that each such category is covered; whereas categories with an ample number of questions will have no questions duplicated between quizzes.

In some embodiments, students are assigned categories within which to author their questions. For instance, in some such embodiments, categories are assigned such that each category is assigned to at least one person on each team, or, if there aren't enough people on a team for such a full distribution, the maximum possible coverage of the most important categories is achieved. Then, to the extent that most or all students on a team actually participate, the probability that everyone on a team will author or critique questions in all categories (or at least have maximized that coverage) is greatly increased.

In preferred embodiments, in cases where not all categories can be covered by every team in the question-authoring phase, categories are assigned such that the resultant quizzes will have the fullest possible coverage. For instance, suppose there are 10 categories of equal importance, but only 5 players on each team, 2 teams, and the system is set to require one question to be authored by each student. Then 5 categories would be assigned to the members of one team, and the other 5 categories assigned to the members of the other team. Thus, in this case, all students would encounter all categories, either during question authoring or quiz-taking.

In various embodiments, assignment of categories to students is accomplished by manual input of the instructor through a screen created for that purpose, or is accomplished automatically by the learning system through random choice or by other deterministic means. Deterministic means include alphabetically going down the list of categories and consecutively making assignments to a list of students which is ordered first by the student's team identifier and second by the alphabetical position of the student's name, or other similar means. In a preferred embodiment, the categories are assigned in order of their importance in order to assure that the most important categories are covered. In some embodiments based on random choice, the probability of choosing more important categories is increased; in some such embodiments, the roulette wheel approach commonly used in genetic algorithms) can be used, where the importance of a category corresponds to its "fitness" in GA terms. In one such embodiment the roulette wheel is divided into separate segments for each team and category, so that an equal-sized segment is allocated to each team for each category, and the total combined segment length of a category is proportional to its importance relative to the complete set of categories. This provides a very simple way of obtaining a distribution of categories across teams such that in each case the distribution is good, and as the course is run repeatedly in a given organization, all categories are assured, over time, to achieve exposure proportional to their importance.

An important factor in the success of the learning system is anonymity. Anonymity helps students to avoid feelings of intimidation and communication-obstructing competition, and encourages people to think for themselves because there is no known expert to listen to. For these reasons, anonymity is designed into the learning system in a very fundamental way.

One problem which has not before been recognized by the prior art but which is recognized in accordance with the present invention is that when a learning system as described herein is carried out in an online setting and courses continue for a significant length of time, certain members of online communities can acquire persistent reputations. That is, even though their real-world identities may be hidden behind "nicknames" or "handles", in the long run, each individual's personality, skills, and other characteristics tend to become known to other members of the community. For instance, in online communities that center around technical discussions, it is typical that a few individuals eventually earn reputations of being the experts; their opinions carry more weight than most community member's and their postings are read and responded to by more people.

These community-acknowledged experts can become intimidating to others in exactly the same way that a respected member of a real-world community can be intimidating. People can listen to these experts rather than thinking for themselves in the same way as occurs in real-world communities.

Typical online embodiments of the learning system include integrated collaboration features which allow individuals to communicate with each other. Typically, a user identifier (ID) of each individual is displayed so that people know who their teammates and partners are and so that it is easier to carry on ongoing discussions. In addition, the user-IDs of item authors are displayed. So it is very possible for someone to acquire expert status in the learning system—a persistent reputation that is based on the visible persistence of each individual's anonymous user ID as time goes on.

The current invention is intended to break the chain of persistency of reputation. The method by which this is accomplished is to give each user separate public and private user ID's and to change them automatically at appropriate times.

The private user ID allows the learning system to track the student's performance over time, and prevents the student from having to remember a series of different user ID$^1$s in accessing the system. In addition, the private user ID can be particularly easy for the student to remember for easy log-on—his first name, for instance.

The public user ID is designed to have enough persistence so that, for instance, collaborative discussions can take place without the confusion that would be caused by total lack of identity. But it is also designed not to have so much persistence that certain individuals will acquire ever-increasing reputations for being the experts.

In a preferred embodiment, the public user ID is automatically changed at the end of every learning system round. In one such preferred embodiment, a 4-digit public user ID is randomly generated for each user and assigned as their new user ID. In another embodiment, users are required to enter a new self-chosen public user ID at the beginning of each round. In yet another embodiment, users are required to give a list of self-chosen public user ID's at the beginning of a learning system course; these are assigned in turn at the beginning of each new round.

In the preferred embodiment, an instructor or administrator is given the means, through an online interface, to change an individual$^1$s public user ID. In some embodiments, however, the instructor is given absolutely no means to access a student's public ID, so as to increase the student's sense of anonymity.

Figure 6:
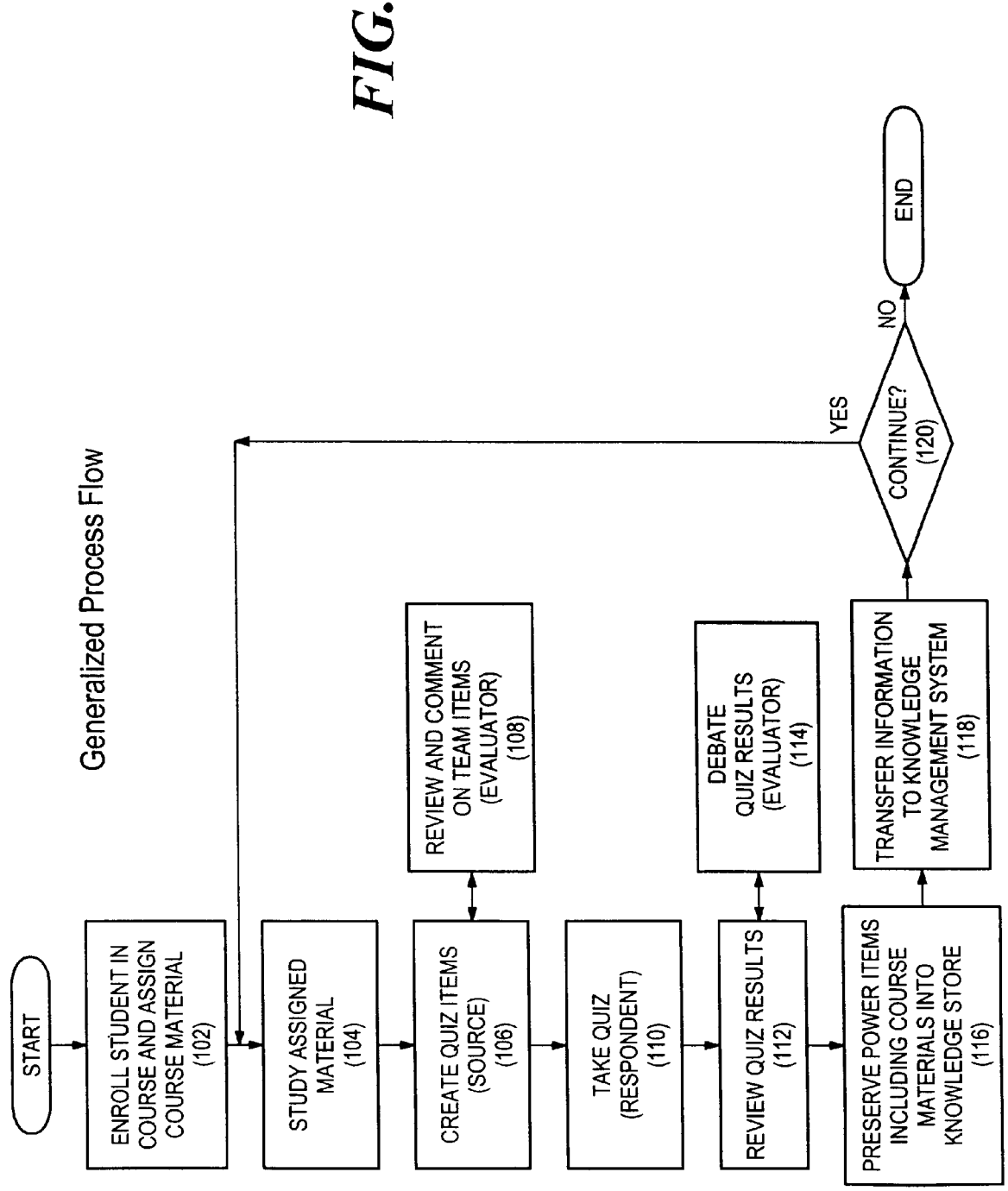
FIG. 6 is flow diagram of a computer implemented training/learning process.

FIG. 6 is a flow diagram showing the processing performed by a processing apparatus which may, for example, be provided as part of collaborative training and online learning system 10 (FIG. 1). The rectangular elements in the flow diagram(s) are herein denoted "processing blocks" and represent computer software instructions or groups of instructions.

Alternatively, the processing blocks represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 6, processing begins with a student enrolling in a course and course material being assigned to the student 102. The student studies the assigned course material 104 and creates quiz items 106. Thus, the student acts as the source or creator of the learning content and the application experience.

After or during the creation of quiz items, the quiz items may be reviewed and commented upon by a peer or expert who is acting as an evaluator of the content created by the others on the team as shown in step 108. In step 110 a user (acting in a respondent role) takes a quiz and in step 112 the quiz results are reviewed. As shown in step 114, users engage in debate about the results of the quiz and again act in an evaluator role.

In step 116 Power Questions including the course materials and the knowledge store are preserved. This may be accomplished, for example, by storing the information in a storage device which may include for example a database. The information may then be transferred to a knowledge management system as shown in step 118. This process may be continued for a variety of different course materials and is repeated for each student or team of students.

Referring now to FIG. 7, a partial record layout 130 of a question item in a typical database record in which is stored the information associated with each particular quiz and/or user includes a plurality of fields 130a–130k. It should be noted that variants of the record layout shown in FIG. 7 may also be used. For example, in some applications it may be advantageous to use filed types which are different from the field types here shown (e.g. fields 130a, e, g–j may be provided as integer field types and filed types 130b–d and may be provided as string field types). In this additional tables or data stores may be required.

The record does not necessarily depict the specific structure of any particular database. Rather, the record illustrates the functional information one of ordinary skill in the art requires to fabricate circuits or to generate computer software to perform the processing required of the particular apparatus. It should be noted that many routine database elements are not shown but are known to those of ordinary skill in the art. It will be appreciated by those of ordinary skill in the art that unless otherwise indicated herein, the particular names, types and description of the records provided in FIG. 7 is illustrative only and can be varied without departing from the spirit of the invention.

Referring now to FIG. 7, a partial record layout 130 of a question item includes string field 130a contains the user ID of the person creating the item. In this particular example, the item being created is the quiz question. It should be noted, however, that to the extent that other items such as comments on questions, possible answers to the question, etc. are created or generated the concepts herein described and suggested in conjunction with this particular question item example still apply. Field 130b is an integer field containing a value identifying the course to which this "item" belongs. Field 130c is an integer field containing a value which indicates the section to which this "item" belongs. Field 130d is an integer field containing a value which indicates the quiz round to which this "item" belongs. Field 130e is a string field containing information representing the group to which this item belongs. Field 130f is an integer field indicating the particular quiz which will contain this item. Field 130g is a string field containing the question text. Field 130h is a string field containing the references text (see e.g. FIG. 4). Field 130i is a string field containing the rationale text (see e.g. FIG. 4). Field 130j is a string field containing a letter corresponding to the correct answer choice. Field 130k is a floating point field containing the calculated Power Score for this item.

Figure 8:
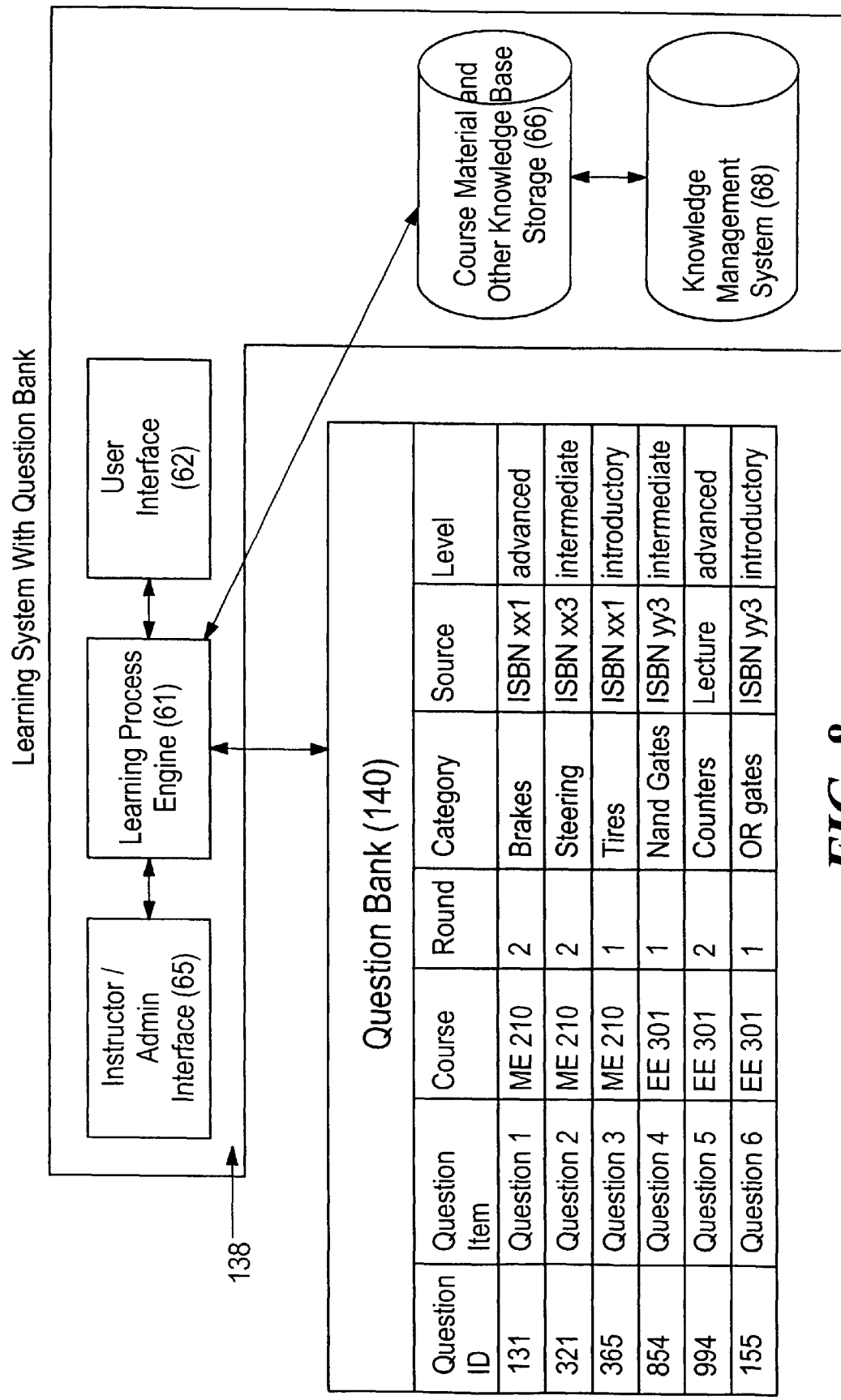
FIG. 8 is a block diagram of an exemplary learning system with a Question Bank feature.

Referring now to FIG. 8, a learning system 138 includes a user interface 62', an administrator interface 65', a knowledge base storage device 66' and a knowledge management system 68'. The user interface 62', administrator interface 65', knowledge base storage device 66' and knowledge management system 68' may be similar to the like named elements described above in conjunction with FIG. 2A.

Coupled to the learning system 138 is a Question Bank 140. Question Bank 140 is provided as a storage mechanism containing questions for use in quizzes. The collection of stored questions are thus referred to herein as a Question Bank 140. The Question Bank 140 may be provided for example as any type of database including but not limited to an object-oriented database management system (ODBMS), a relational database management system (e.g. DB2, SQL, etc.), a hierarchical database, a network database, a distributed database (i.e. a collection of multiple, logically interrelated databases distributed over a computer network) or any other type of database package. Thus, the Question Bank 140 can be implemented using object-oriented technology or via text files.

The Question Bank allows groups of people to use the learning system when the group size is too small to generate meaningful statistics by itself. At the extreme, the "group" can consist of one person.

When a quiz is generated, there are certain desirable quiz characteristics for effective learning and measurement. One such desirable characteristic is that the quiz have an appropriate length (i.e. the quiz should include an appropriate number of questions). Ideally the quiz should not contain so few questions that it doesn't provide an adequate means for measuring performance. On-the-other-hand, the quiz should not contain so many questions that it is overly burdensome for a student to complete. Another desirable quiz characteristic is broad coverage of the subject matter. Both of these issues will be addressed in the following text.

In preferred embodiments, the instructor can specify a target size for quizzes. This is done, for instance, by means of a pull-down list or text-entry field through which the instructor can specify the number of questions to be included in the quiz. In most embodiments this input means occurs on the pages which are devoted to instructor or administrator round management. In some embodiments, there is a preset or default target quiz size which may correspond to an ideal quiz size for the particular subject matter included on the quiz. In embodiments where a third-party vendor configures a course, this vendor may set the default target quiz size. The default value can be set by means of a configuration file on disk or hard-coded in the application. The ideal target quiz size is determined by a variety of factors including but not limited to the nature of the course study material and the length of particular questions in the quiz. Such factors may be different for different courses. Thus the ideal quiz size can be different for different courses.

During quiz generation, quizzes are generated to match, as closely as possible, the ideal target quiz size. The Question Bank is helpful for this in the case that the group currently taking a course in the learning system is not large enough to generate quizzes of sufficient lengths. In such a case, questions may be drawn automatically from the Question Bank to allow generation of quizzes of ideal or close to ideal length.

In some embodiments of the Question Bank, questions from different courses are stored together in the same database file, with fields (usually keys) indicating the originating course. In some embodiments, Category and Level fields are provided in this database file, so those questions created in one course can be used to create quizzes for another. In related embodiments, fields are provided that identify the source material. For instance, in some embodiments a field is provided to provide the title and/or ISBN of the book upon which the course is based; other fields, in various embodiments, contain the chapter, section, and/or page numbers that indicate the part of the book the given question pertains to. These embodiments enable the Question Bank to be useful across different courses as long as they cover similar material.

In further embodiments, means are provided for questions to be used in a current course which originate, not only in other courses, but in other installations of the learning system. In some embodiments, a database is used for the Question Bank that is shared by various installations that may reside at different physical locations and operated by different companies.

Most modern database systems have no requirements that a particular file or table be on any particular machine. Database servers are separate processes from the applications that use them and they communicate by such means as sockets; communicating sockets can be on the same machine or on different machines. Thus there are no technical barriers to various installations accessing a Question Bank at one location or even distributed over multiple remote locations.

When a quiz is created at one installation, it can thus use such a shared database in such a manner that questions created at other installations can be retrieved to obtain an optimal mix of categories or for other reasons. In such a case the Question Bank is used exactly as a Question Bank that was not shared would be. The learning system has already been given a list of the categories that need to be covered by the course. It knows what categories are already covered by the questions that have been created in the current round. It can therefore easily determine what categories still remain to be covered. Then it simply remains to retrieve questions of the appropriate course, level, and category from the database.

In some embodiments this is accomplished by using a relational (for instance, SQL) database, having one table for the Question Bank although other database organizations can be used including object oriented database. This table contains attributes which enable the appropriate questions to be retrieved. In one embodiment, these attributes include category, level, subject, and Question Power. In another embodiment, they include an ISBN, chapter number, section number, and category. In an embodiment involving prepackaged learning system courses, the attributes may include a universal course identifier and level; these universal course identifiers are unique per course even when there are multiple third-party suppliers of courses. In other embodiments other attributes are used.

In addition, a single table can have attributes enabling question retrieval based on different criteria. For instance, the same Question Bank implementation may provide attributes for retrieval by subject, level, and category or by ISBN, chapter, and section, so that questions may retrieved in the most convenient way for a given course. For efficiency reasons these fields may comprise a concatenated secondary key, and/or the fields may individually be secondary keys. Other attributes, in most embodiments, identify the organization where the company was originally generated, as well as the specific user who authored it, and other information.

When questions are required in order to obtain an appropriate distribution of categories for a particular quiz, questions are retrieved from a shared Question Bank using the relevant information, in a similar manner to that by which they are retrieved in implementations in which no sharing between installations is done. For instance, if a course's progress is keyed to a particular book, questions pertaining the relevant ISBN, chapter, section, and categories are be retrieved.

In some embodiments, questions are stored in the Question Bank using standard text retrieval techniques such that all questions relevant to a particular text-based query can be quickly retrieved. These methods, including the use of concept vectors, are known to practitioners in the text retrieval discipline and some such are built in to certain relational database engines such as DB2. In this way, the Question Bank can be used to generate better distributions of subject areas on a quiz even without categories.

Suppose that a company, which is using the learning system and is making use of categories, needs to add questions from certain categories to a particular quiz. Suppose further that it has not yet added questions to the Question Bank that are relevant to the course in question. In addition suppose that it has access to a shared Question Bank into which other companies, which are not using categories, have added questions. Then the name of the category can be fed into the text retrieval engine to return questions that are likely to be relevant to the given category. Since additional screening can also be done by ISBN/Chapter/Section, or other means of assuring the proper subject and level is retrieved, the retrieved question will probably not be too far off-base. Even if the text retrieval engine is "fooled" by coincidences of phrasing to retrieve a question that isn't really in the desired category, it will at least still be at the right subject and level, if the additional screening attributes are used.

Similarly, if the company which needs to pull questions from the Question Bank is not using categories, concept or word vectors can be constructed to be maximally distant from the concept or word vectors representing questions already available for a given set of quizzes. In one embodiment, this is accomplished by means of genetic algorithms. Chromosomes are defined to represent a concept vector. The fitness function is the sum of distances between the chromosome and the other concept vectors. The GA evolves the chromosome set toward maximizing the fitness of the chromosomes—that is, finding vectors that have the most distance from other vectors. In some embodiments, there is a pre-set threshold such that if the maximally distant vector has a combined distance from other vectors that exceeds this threshold (where the combining is achieved by summing or other means), then the instructor will be alerted through email or other means, and either automatically, or at the decision of the instructor, questions that match the winning vector(s) will be requested from the Question Bank and, if found, added to the quizzes.

In such embodiments, fields identifying the text book and chapter or other characteristics that allow the course and level for a quiz to be identified are very useful.

In some embodiments, most of which do not involved a shared database file, means are provided where questions from an external source can be added into the Question Bank. (In such embodiments, export facilities are usually also provided.) In some cases, questions may be sold to go into the Question Bank for a particular course. For example, a textbook vendor may supply questions to accompany a learning system course based on a particular textbook. In other cases, a company that operates learning system courses for internal purposes may want to make generated questions available to other companies as a revenue stream.

Such import and export means include flat file input and output such as provided by many software programs and which anyone of average skill in their art of software creation could create without further explanation. Other means include input screens for hand input. Others include network data transfer, such as based on the TCP/IP or FTP protocols.

Another characteristic of the Question Bank is the fact that as questions appear on various quizzes over time, the system is able to gather more and more information about these questions. This information can be used to refine the learning system's assessment of these questions. For instance, in some embodiments the Power Score for each question is refined over time.

In some such embodiments, Power Score and Consensus Score are calculated according to one of the algorithms that can be used for that purpose. All data needed to do such calculations is retained in the Question Bank database over time. When the question appears on another quiz, the Power and Consensus Scores are recalculated. Similarly other question attributes such as average rating can be recalculated. In various embodiments, it is possible to store certain summary information with each question rather than all data that has been collected in order to refine a calculation over time; such embodiments take advantage of that potential. For instance, in embodiments in which the average rating for a question is recalculated over time, it is not necessary to store all the individual ratings, but merely to store the sum of ratings and number of ratings collected to date.

When selecting questions from the Question Bank for inclusion on a quiz, various embodiments use various criteria in doing so. In preferred embodiments, the Power Score is used to determine the best questions to use in quizzes; the most effective quiz will be comprised of the most powerful questions. In various embodiments, other criteria include selecting categories that would not be covered sufficiently on a quiz without reaching into the Question Bank. This is likely to occur, for instance, when there are too few players to generate questions that cover all of the subject categories in a course.

In many preferred embodiments questions are be allocated to quizzes according to category, using algorithms analogous to those described for assigning categories to students for question authoring. These techniques assure an appropriate distribution of categories on each quiz.

In some embodiments, questions created in the current course are allocated to quizzes before questions are obtained for that purpose from the Question Bank. In order embodiments, questions for the current course can be rejected in favor of questions from the Question Bank according to various criteria, including, but not limited to, ratings provided by the Question Authoring team regarding the expected Power Score of a question. Questions that rank very poorly in such ratings may be replaced by questions from the Question Bank that achieved high Power Scores.

In some embodiments, simple categories are replaced for quiz creation by other means of assuring an adequate distribution of questions. In preferred such embodiments, concept or word vectors are obtained by analyzing the text of each question. Concept and word vectors are well-known to practitioners of the art of computer text retrieval, and such practitioners have the know-how to generate them. Concept and word vectors usually take into account the frequency with which a concept or word is mentioned in a text (Term Weighting Approaches in Automatic Text Retrieval, Gerard Salton, Chris Buckley, 87–881, November 1987, Department of Computer Science, Cornell University). When using question concept or word vectors to generate quizzes, the questions are chosen such that the distance of each question's concept vector from the others is maximized. In one embodiment, a question is randomly chosen for each quiz. Then for each subsequent question, the next question to be added to a quiz is the one that maximizes the sum of distances for all vectors on that quiz. Other embodiments use other means of maximizing the distances, such as maximizing the average geometric mean distance. Distances are computed using such techniques as mean squared distance, correlation, etc.

In preferred embodiments, some questions in the Question Bank are set aside for purposes of studying. In some such embodiments, all questions in the Question Bank are made available for studying. In such embodiments where the Question Bank is also used to add questions to quizzes, the answers to the questions are not made available to the student who is using the questions for studying. In such embodiments, some questions in the Question Bank are tagged as being for study purposes; this is accomplished with an indicator field for that purpose or by separating the two types of questions into separate database files or by some other means. In preferred embodiments, questions with high power are chosen for study materials. In many embodiments, the instructor or administrator is enabled to specify the number of Question Bank questions in a course that will be made available for study. In some embodiments, the questions to be used for study can be hand-chosen by the instructor according to their perceived ability to help the student more fully learn the material. Checkboxes and other standard input means are provided for this purpose, according to the particular embodiment.

Figure 8A:
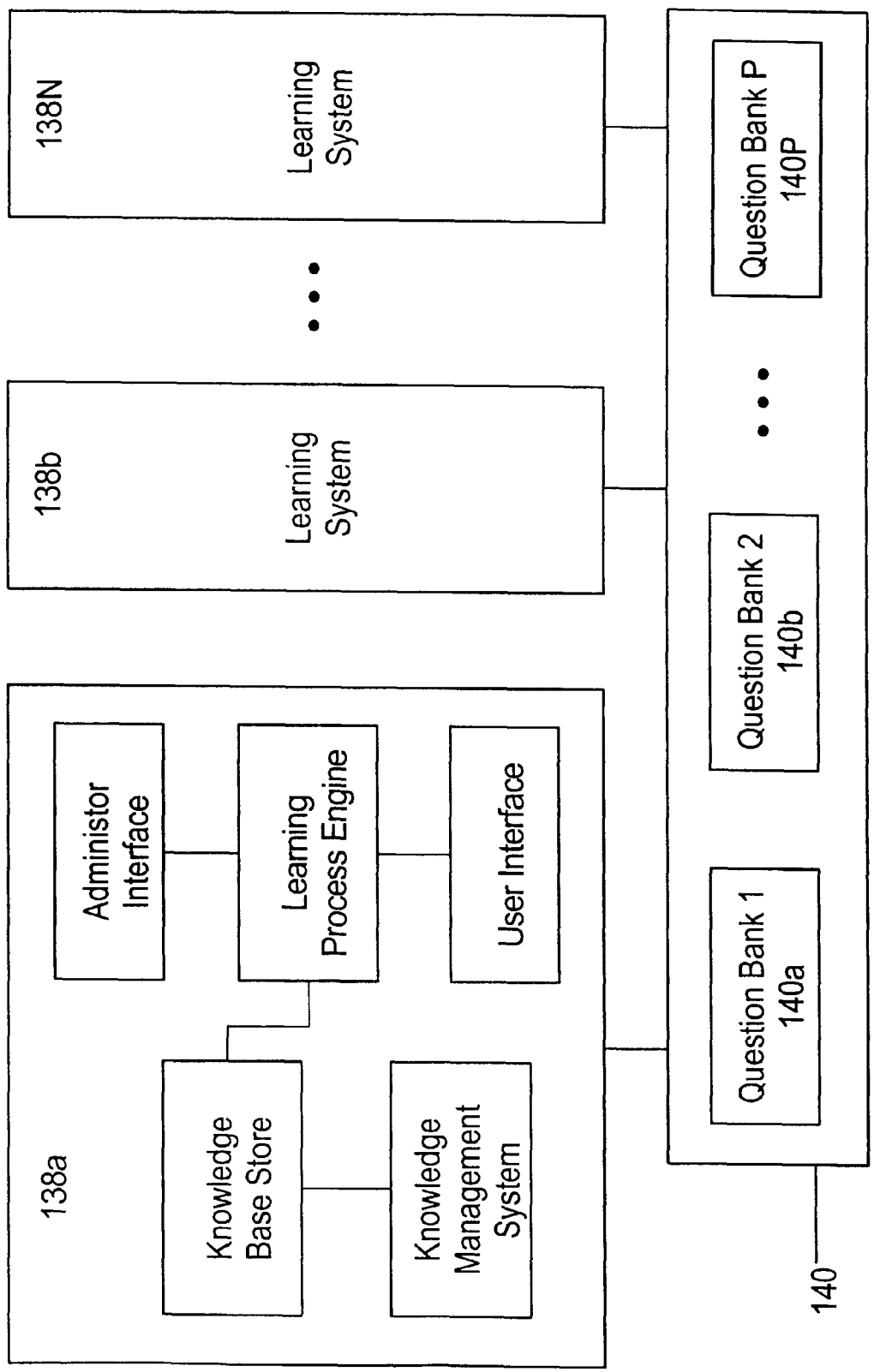
FIG. 8A is a block diagram of plural learning systems coupled to one or more Question Banks.

Referring now to FIG. 8A in which like elements of FIG. 8 are provided having like reference designations, a plurality of leaning systems 138a–138N are coupled to one or more Question Banks 140a–140P. Each of the learning systems 138a–138N are implemented for different groups of users (e.g. at different companies) and thus there is no direct organized or controlled interaction between the users (i.e. team members, and/or administrators) of each of the learning systems during the rounds. Each of the systems 138a–138N have access to Question Bank 140 which is comprised of a plurality of Question Banks 140a–140P. That is the Question Bank 140 can be provided from a single database or file or from a plurality of different databases or files which are coupled together.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. A learning system comprising:
   a learning process engine comprising:
   (a) means for providing study materials to student user of the learning system;
   (b) means for enabling a student user of the learning system to author a question;
   (c) means for collaborating on and reviewing a question generated by a student user of the learning system;

(d) means for taking a quiz comprised of one or more questions generated by one or more student users of the learning system; and
(e) means for reviewing quiz results;
(f) a course material and knowledge base storage device coupled to said learning process engine for receiving information and data from and providing information and data to said learning process engine;
(g) a student user interface coupled to said learning process engine, said student user interface comprising means for displaying at a student-user site at least one template which includes a question field for accepting student generated questions, an answer field for accepting one or more student generated answers, a discussion field for accepting commentary from one or more student users, a rationale field for accepting rationale as to why a particular answer is correct in response to a particular one of the one or more student generated questions and a references field;
(h) an administrator interface coupled to said learning process engine, said administrator interface for providing a privileged user the ability to setup, administer, monitor, and manage a learning process; and wherein said learning process engine receives information from and provides information to said student user interface and said administrator interface.

2. The learning system of claim 1 wherein:
said learning process engine further comprises means for forming teams of student users of the learning system; and
said means for collaborating on and reviewing a question generated by a student user comprises means for allowing student users on the same team to collaborate in authoring a question and reviewing the question.

3. The learning system of claim 1 wherein said learning process engine comprises means for enabling a student to utilize study materials provided by said means for providing study materials through said student user interface.

4. The learning system of claim 1 further comprising means for allowing one or more instructors to interact with, monitor, and manage the student activities.

5. The learning system of claim 1 further comprising means for allowing one or more experts to interact with, monitor, and manage the student activities.

6. The system of claim 2 wherein said user interface is provided as a graphical user interface including a student home page, an item authoring interface, a team collaboration interface, a quiz taking interface, and a quiz results interface.

7. The system of claim 3 wherein said student user interface comprises a student home page with said student home page comprising:
a link to a study materials page;
a link to a student question authoring page;
a link to a review team question page;
a text box in which is provided information and instruction to the student-user; and
a schedule of events which defines time periods within which certain events must be completed.

8. The system of claim 7 wherein said student question authoring page comprises:
a first question field in which a question may be written;
a plurality of answer fields in which answers to a question entered in the first question field may be disposed; and
a rationale field for holding a rationale to provide reasons why a particular answer to a student authored question is correct.

9. The system of claim 4 wherein said administrator interface is provided as a graphical user interface comprising:
a course setup interface;
a course monitoring interface;
a user enrollment interface;
a course intervention interface; and
a team management interface.

10. The system of claim 9 wherein the course monitoring interface comprises means for allowing an instructor to monitor the performance of a class, teams within the class, or individual students including monitoring measures of participation, collaboration, question power, and quiz metrics.

11. The system of claim 9 wherein the team management interface comprises means for arranging manually and means for arranging teams using a set of predefined assignment functions.

12. The system of claim 10 wherein the assignment functions correspond to at least one of:
a random assignment of students to teams; and
grouping of teams by previous scores.

* * * * *

UNITED STATES PATENT AND TRADEMARK OFFICE
CERTIFICATE OF CORRECTION

PATENT NO. : 6,471,521 B1
DATED : October 29, 2002
INVENTOR(S) : Charles F. Dornbush et al.

It is certified that error appears in the above-identified patent and that said Letters Patent is hereby corrected as shown below:

<u>Column 4,</u>
Line 2, delete "same the meaning" and replace with -- same meaning --.

<u>Column 5,</u>
Line 1, delete "to given a" and replace with -- to a given --.

<u>Column 10,</u>
Line 62, delete "to "team public."" and replace with -- to "team public.") --.

<u>Column 12,</u>
Line 19, delete "rated highly" and replace with -- rate highly --.

<u>Column 14,</u>
Line 9, delete "is motivate" and replace with -- is to motivate --.

<u>Column 15,</u>
Line 21, delete "metric(other" and replace with -- metric (other --.
Line 62, delete "may be not" and replace with -- may not be --.

<u>Column 19,</u>
Line 15, delete "algorithms)" and replace with -- algorithms --.

<u>Column 23,</u>
Line 45, delete "may retrieved" and replace with -- may be retrieved --.
Line 59, delete "are be" and replace with -- are --.

<u>Column 24,</u>
Line 43, delete "do not involved" and replace with -- do not involve --.

<u>Column 25,</u>
Line 34, delete "In order" and replace with -- In other --.

UNITED STATES PATENT AND TRADEMARK OFFICE
CERTIFICATE OF CORRECTION

PATENT NO. : 6,471,521 B1
DATED : October 29, 2002
INVENTOR(S) : Charles F. Dornbush et al.

It is certified that error appears in the above-identified patent and that said Letters Patent is hereby corrected as shown below:

Column 26,
Line 21, delete "of leaning systems" and replace with -- of learning systems --.

Signed and Sealed this

Seventeenth Day of February, 2004

JON W. DUDAS
*Acting Director of the United States Patent and Trademark Office*